United States Patent
Bent et al.

(10) Patent No.: US 11,093,468 B1
(45) Date of Patent: Aug. 17, 2021

(54) ADVANCED METADATA MANAGEMENT

(71) Applicant: EMC IP Holding Company LLC, Hopkinton, MA (US)

(72) Inventors: John M. Bent, Los Alamos, NM (US); Sorin Faibish, Newton, MA (US); Zhenhua Zhang, Beijing (CN); Xuezhao Liu, Beijing (CN); Jingwang Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 988 days.

(21) Appl. No.: 14/230,829

(22) Filed: Mar. 31, 2014

(51) Int. Cl.
*G06F 16/31* (2019.01)
*G06F 16/22* (2019.01)

(52) U.S. Cl.
CPC .......... *G06F 16/2228* (2019.01); *G06F 16/22* (2019.01); *G06F 16/2237* (2019.01); *G06F 16/2246* (2019.01); *G06F 16/2264* (2019.01); *G06F 16/316* (2019.01)

(58) Field of Classification Search
CPC .. G06F 16/2228; G06F 16/22; G06F 16/2237; G06F 16/2246; G06F 16/2264; G06F 16/316; G06F 17/30194; G06F 17/30218; G06F 17/3023; G06F 12/126
USPC .......................................................... 707/741
See application file for complete search history.

(56) References Cited

U.S. PATENT DOCUMENTS

| | | | |
|---|---|---|---|
| 7,523,130 B1 * | 4/2009 | Meadway | G06F 17/30575 |
| 7,779,295 B1 * | 8/2010 | Shah | G06F 11/1458 |
| | | | 714/13 |
| 8,412,689 B2 * | 4/2013 | Reid | G06F 9/466 |
| | | | 707/703 |
| 9,213,489 B1 * | 12/2015 | Nowoczynski | G06F 3/0688 |
| 2006/0206498 A1 * | 9/2006 | Fujiwara | G06F 17/30722 |
| 2007/0174360 A1 * | 7/2007 | Yagawa | G06F 16/10 |
| 2008/0228992 A1 * | 9/2008 | Dumitru | G06F 3/0613 |
| | | | 711/100 |
| 2011/0320732 A1 * | 12/2011 | Ambroladze | G06F 12/126 |
| | | | 711/135 |
| 2012/0254175 A1 * | 10/2012 | Horowitz | G06F 16/278 |
| | | | 707/737 |

(Continued)

OTHER PUBLICATIONS

Nunez "Multi-Dimensional Hashed Indexed Metadata/Middleware (MDHIM) Project" Los Alamo Ultrascale Systems Research Center High Performance Computing Systems Integration, May 10, 2012 (Year: 2012).*

(Continued)

*Primary Examiner* — Tamara T Kyle
*Assistant Examiner* — Berhanu Mitiku
(74) *Attorney, Agent, or Firm* — Ryan, Mason & Lewis, LLP

(57) ABSTRACT

A computer-executable method, system, and computer program product for managing metadata in a distributed data storage system, wherein the distributed data storage system includes a first burst buffer having a key-value store enabled to store metadata, the computer-executable method, system, and computer program product comprising receiving, from a compute node, metadata related to data stored within the distributed data storage system, indexing the metadata at the first burst buffer, and processing the metadata in the first burst buffer.

20 Claims, 18 Drawing Sheets

(56) References Cited

U.S. PATENT DOCUMENTS

| | | | | |
|---|---|---|---|---|
| 2012/0278529 A1* | 11/2012 | Hars | ................... | G06F 12/0246 |
| | | | | 711/103 |
| 2013/0042060 A1* | 2/2013 | Marukame | ........ | G06F 17/30982 |
| | | | | 711/108 |
| 2013/0110783 A1* | 5/2013 | Wertheimer | ............ | G06F 11/14 |
| | | | | 707/646 |
| 2013/0325827 A1* | 12/2013 | Markus | ................... | G06F 16/23 |
| | | | | 707/703 |
| 2014/0122510 A1* | 5/2014 | Namkoong | ....... | G06F 17/30584 |
| | | | | 707/755 |
| 2015/0095345 A1* | 4/2015 | Arai | .................... | G06F 16/2228 |
| | | | | 707/744 |
| 2015/0134780 A1* | 5/2015 | Weber | ............... | G06F 17/30091 |
| | | | | 709/219 |
| 2015/0205680 A1* | 7/2015 | Kimmel | .............. | G06F 12/0246 |
| | | | | 707/649 |

OTHER PUBLICATIONS

Nunez "Multi-Dimensional Hashed Indexed Metadata/Middleware (MDHIM) Project" Ultrascale Systems Research Center High Performance Computing Systems Integration May 10, 2012.*

Nunez "Multi-Dimensional Hashed Indexed Metadata/Middleware (MDHIM) Project" Ultrascale system Research center High Performance Computing Systems Integration May 10, 2012 (Year: 2012).*

* cited by examiner

ADVANCED METADATA MANAGEMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing metadata in a distributed data storage system, wherein the distributed data storage system includes a first burst buffer having a key-value store enabled to store metadata, the computer-executable method, system, and computer program product comprising receiving, from a compute node, metadata related to data stored within the distributed data storage system, indexing the metadata at the first burst buffer, and processing the metadata in the first burst buffer.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
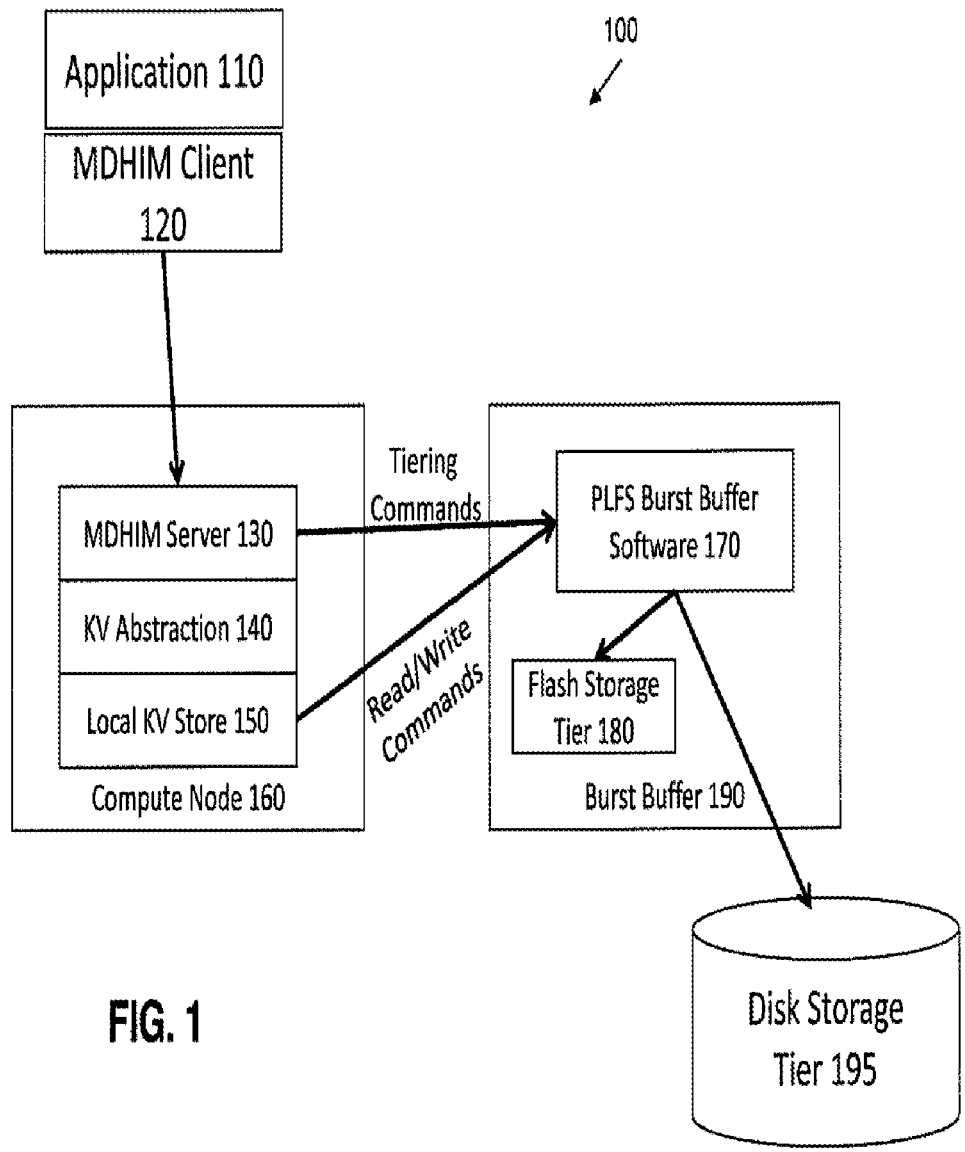
FIG. 1 illustrates an exemplary partitioned key-value store incorporating aspects of the invention.

Traditionally, in High Performance Computing (HPC) environments, data storage systems have been dealing with the increasing amounts of data to be processed. Conventionally, HPC environments are growing to exascale (and larger) by becoming more distributed. Typically, distributed computing has some performance issues created by the complication of synchronizing data across platforms in a HPC environment. Typically, improving performance of a HPC environment while improving data coordination would be beneficial to the performance of data storage systems in a HPC environment.

In many embodiments, the current disclosure may enable creation of a transactional, versioned, distributed, sharded KV store. In various embodiments, the current disclosure may enable a HPC Environment to efficiently synchronize, coordinate, and/or process massive scale workloads. In certain embodiments, the current disclosure may enable a HPC environment to manage and/or coordinate check pointing and/or restarting of data storage systems in a HPC environment. In other embodiments, the current disclosure may enable a HPC environment to include one or more compute nodes, one or more burst buffer appliances, and/or one or more data storage arrays. In many embodiments, the current disclosure may enable a user to create and/or manage transactions in a HPC environment. In various embodiments, the current disclosure may enable a user to create and/or manage checkpoints in a HPC environment.

In many embodiments, the current disclosure may enable users to ensure consistency between user created transactions and/or versions of a user's data and associated metadata. In various embodiments, the current disclosure may enable a data storage system to comingle metadata with user created metadata. In certain embodiments, the current disclosure may enable a HPC environment to utilize a data management module to manage local metadata, external user created metadata, as well as received data and/or I/Os from compute nodes.

In other embodiments, the current disclosure may enable using one or more index tables to increase efficiency of synchronization, batch processing, configurable, transactional, and semantic resharding. In many embodiments, the current disclosure may enable implementation of multi-key support, where more than one key may be used to query at one time. In various embodiments, the current disclosure may enable multi-dimensional metadata querying. In certain embodiments, the current disclosure may enable multi-dimensional key-value querying. In other embodiments, the current disclosure may enable a HPC environment to split processed data and associated metadata onto two or more data storage systems. In some embodiments, splitting processed data and associated metadata onto two or more data storage systems may enable performance increases. In various embodiments, splitting processed data and associated metadata may also divide the work required to manage, create, and/or retrieve data stored within a specified data storage system. In certain embodiments, a total amount of metadata and/or work to retrieve/use metadata may not decrease, however, the total amount of work may be split amongst multiple nodes instead of processed by a single node.

In many embodiments, the current disclosure may enable creation of a HPC environment which may include one or more computing nodes in communication with one or more burst buffers and data storage arrays. In various embodiments, the current disclosure may enable a HPC environment to distribute data and/or metadata throughout an HPC environment on one or more data storage systems. In certain embodiments, a burst buffer appliance may include flash storage, a data management module, a distributed Key-Value (KV) store, and may be in communication with one or more data storage arrays. In some embodiments, a data management module may be enabled to manage received data on a distributed level. In many embodiments, a data management module may be enabled to communicate with one or more other data management modules on other burst buffers to coordinate and/or support coordination of storing of large data sets, sometimes referred to as big data.

In many embodiments, the current disclosure may enable a large data set to be divided into two or more portions of data that may be processed by two or more compute nodes. In various embodiments, each compute node may be in communication with a burst buffer appliance which may be in communication with one or more data storage arrays. In other embodiments, a burst buffer appliance may include a data management module, distributed Key-Value (KV) store, and a fast data storage buffer. In some embodiments, a fast data storage buffer may be flash storage and/or other fast storage device.

In many embodiments, the current disclosure may enable a HPC environment to manage metadata using an MPI-sharded KV store. In various embodiments, the current disclosure may utilize a MPI-sharded KV store, such as a Multidimensional Data Hashing Indexing Middleware (MDHIM). In certain embodiments, the current disclosure may enable a HPC environment to manage data objects, data containers, transactions, events, and/or data storage. In other embodiments, the current disclosure may enable a HPC environment to manage meta-data for data objects, data containers, transactions, events, and/or data storage artifacts. In some embodiments, a data management module may be enabled to manage data and the associated metadata within a HPC environment. In many embodiments, the current disclosure may enable a data management module to distribute and/or retrieve metadata throughout an HPC environment to enable efficient use of resources. In various embodiments, distributed metadata may increase the efficiency of an HPC environment by reducing the amount of processing required to analyze, create, distribute, and/or retrieve metadata.

In many embodiments, a data management module may manage millions or billions of objects, containers, events, and/or transactions in a HPC environment. In various embodiments, a data management module may be enabled to manage and/or synchronize one or more asynchronous events and their queues stored within a HPC environment. In many embodiments, metadata stored may contain information about each object, container, event, and/or transaction, such as where the associated data may be located across a set of burst buffers in the HPC environment. In various embodiments, metadata may contain information related to which portion of secondary storage within the HPC environment data is stored.

In many embodiments, the HPC Environment may utilize transactions to manage synchronization and/or coordination of distributed data storage. In various embodiments, each transaction may have an identifier, such transaction identifier (TID) may enable a data management module to manage data created, deleted, and/or managed within a HPC Environment. In various embodiments, a TID may be included as a parameter to a command sent to the data management module. In certain embodiments, a TID may be sent during a read request to a data management module to ensure multiple reads may be able to view a consistent version of the data. In other embodiments, a write may specify a TID to ensure multiple writes may be applied atomically. In some embodiments, a data management module may not allow a user to read and write using one TID at the same time. In many embodiments, a TID may be a 64 bit value. In other embodiments, the size of a TID may vary depending on the size of the HPC Environment. In various embodiments, a data management module may reserve portions of a TID for internal processing. In some embodiments, portions of data reserved for internal processing may relate to replica flags and/or other flags marking data within a HPC environment. In certain embodiments, a transaction and/or TID may be metadata. In some embodiments, metadata may be stored that may enable versioning of data stored in a HPC environment.

In many embodiments, a data management module may retain TID information for metadata stored and/or managed by each respective data management module. In various embodiments, a data management module may retain a lowest_durable_TID which may include the lowest TID which may have been migrated from primary storage to a secondary storage layer. In certain embodiments, a data management module may retain a latest_readable_TID which may be associated with the latest (and/or highest) readable data on a Burst Buffer appliance. In other embodiments, the latest readable data on a burst buffer appliance may not have been migrated to secondary storage and/or underlying data storage arrays. In many embodiments, a data management module may retain a latest_writing_TID which may include the latest (and/or highest) TID which may have started writing.

In many embodiments, a HPC environment as described in the current disclosure may be enabled to be created using one or more compute nodes, one or more burst buffers, and/or one or more data storage devices. In various embodiments, a burst buffer may include an I/O Dispatcher for data management (discussed below in FIG. 9) and/or a Multidimensional Data Hashing Indexing Middleware (MDHIM) for a distributed Key Value (KV) store.

Multidimensional Data Hashing Indexing Middleware (MDHIM)

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide parallel storage systems with a burst buffer appliance for storage of a partitioned key-value store across a plurality of storage tiers. While the exemplary embodiments of the present invention employ MDHIM, other MPI-Linked partitioned data stores can be employed, as would be apparent to a person of ordinary skill in the art.

According to one aspect of the invention, a burst buffer appliance is provided in a partitioned key-value store. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

According to another aspect of the invention, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

According to a further aspect of the invention, the local key-values are optionally sorted both locally by the local store and globally by the overall MDHIM framework. Another aspect of the invention leverages the local and global sorting to provide batch input/output (IO) operations that aggregate multiple requests into batch operations on one or more sorted ranges. In this manner, desired data can be obtained using a reduced number of messages over the network.

FIG. 1 illustrates an exemplary partitioned key-value store 100 incorporating aspects of the invention. As shown in FIG. 1, the exemplary partitioned key-value store 100 comprises an exemplary application, such as application 110, that can read, write and/or query key-value data in the exemplary partitioned key-value store 100, using one or more MDHIM clients, such as the exemplary MDHIM client 120. One or more MDHIM servers, such as MDHIM server 130, control the storage of key-value data using a key-value abstraction layer 140 and a local key-value store 150 on a compute node 160 in a high performance computing (HPC) environment, in a known manner. Generally, the local key-value store 150 processes key-value operations such as leveldb or pblisam.

An exemplary architecture for an MDHIM partitioned key-value store is discussed further below in conjunction with FIG. 3. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As indicated above, one aspect of the invention provides a burst buffer appliance 190 in the partitioned key-value store 100. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

As shown in FIG. 1, the exemplary burst buffer appliance 190 comprises parallel log structured file system (PLFS) burst buffer software 170 that provides access to an exemplary flash storage tier 180 and an exemplary disk storage tier 195. The exemplary flash storage tier 180 may be integrated within the burst buffer appliance 190 or an external storage device. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As shown in FIG. 1, the exemplary burst buffer appliance 190 is configured to process tiering commands from the MDHIM server 130 on compute node 160, as well as read and write commands from the local key value store 150 on compute node 160.

The burst buffer appliance 190 is configured to communicate with clients, object storage servers and MDHIM servers 130 over a network. The burst buffer appliance 190 in the present embodiment is assumed to comprise a flash memory or other high-speed memory having a substantially lower access time than the disk storage tier 195. The burst buffer appliance 190 may optionally comprise an analytics engine, and may include other components.

Although flash memory will often be used for the high-speed memory of the burst buffer appliance 190, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes (not shown) and a file system such as storage tiers 180, 195, for storing bursts of data associated with different types of IO operations.

The burst buffer appliance 190 further comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein may be viewed as examples of what are more generally referred to as "computer program products" storing executable computer program code.

Also included in the burst buffer appliance is network interface circuitry. The network interface circuitry allows the burst buffer appliance to communicate over the network with other devices. The network interface circuitry may comprise, for example, one or more conventional transceivers.

The storage tiering functionality of the burst buffer appliance 190 may be implemented at least in part in the form of software that is stored in memory and executed by a processor.

The burst buffer appliance 190 comprising processor, memory and network interface components as described above is an example of what is more generally referred to herein as a "processing device." Each of the devices herein may similarly be implemented as a processing device comprising processor, memory and network interface components.

Although only a single burst buffer appliance 190 is shown in the FIG. 1 embodiment, a given partitioned key-value store in other embodiments may comprise multiple burst buffer appliances 190.

The exemplary flash storage tier 180 and exemplary disk storage tier 195 in the present embodiment are arranged into first and second storage tiers, also denoted as Storage Tier 1 and Storage Tier 2, although it is to be appreciated that more than two storage tiers may be used in other embodiments. Each of the exemplary flash storage tier 180 and exemplary disk storage tier 195 may be viewed as being representative of an object storage target of a corresponding object storage server. The first and second storage tiers comprise respective disjoint subsets of the object storage servers.

The different storage tiers 180 and 195 in this embodiment comprise different types of storage devices having different performance characteristics. The flash storage devices of the storage tier 180 are generally significantly faster in terms of read and write access times than the disk storage devices of the storage tier 195. The flash storage devices are therefore considered "fast" devices in this embodiment relative to the "slow" disk storage devices. Accordingly, the exemplary partitioned key-value store 100 may be characterized in the present embodiment as having a "fast" storage tier 180 and a "slow" storage tier 195, where "fast" and "slow" in this context are relative terms and not intended to denote any particular absolute performance level. These storage tiers comprise respective disjoint subsets of object storage servers and their associated object storage targets. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices in the exemplary flash storage tier 180 may be implemented, by way of example, using respective flash Peripheral Component Interconnect Express (PCIe) cards or other types of memory cards installed in a computer or other processing device that implements the corresponding object storage server. Numerous alternative arrangements are possible. Also, a variety of other types of non-volatile or volatile memory in any combination may be used to implement at least a portion of the storage devices. Examples of alternatives to flash storage devices that may be used as respective object storage targets in other embodiments of the invention include non-volatile memories such as magnetic random access memory (MRAM) and phase change random access memory (PC-RAM).

The flash storage devices of the exemplary flash storage tier 180 generally provide higher performance than the disk storage devices but the disk storage devices of the disk storage tier 195 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the exemplary partitioned key-value store 100, leading to enhanced system performance relative to conventional arrangements, while additionally or alternatively providing an ability to achieve particular levels of performance at lower cost.

The embodiment of FIG. 1 provides an MDHIM partitioned key-value store with tiered storage where the MDHIM server 130 executes on a compute node 160. The exemplary MDHIM server 130 can be implemented in a conventional manner, and be unaware of tiering provided by the burst buffer appliance 190 and transparently benefit from the improved performance. In another variation, the MDHIM server 130 can be burst buffer aware and interface to the application programming interface (API) of the burst buffer appliance 190 to help make intelligent tiering decisions using one or more tiering commands, as shown in FIG. 1.

Figure 2:
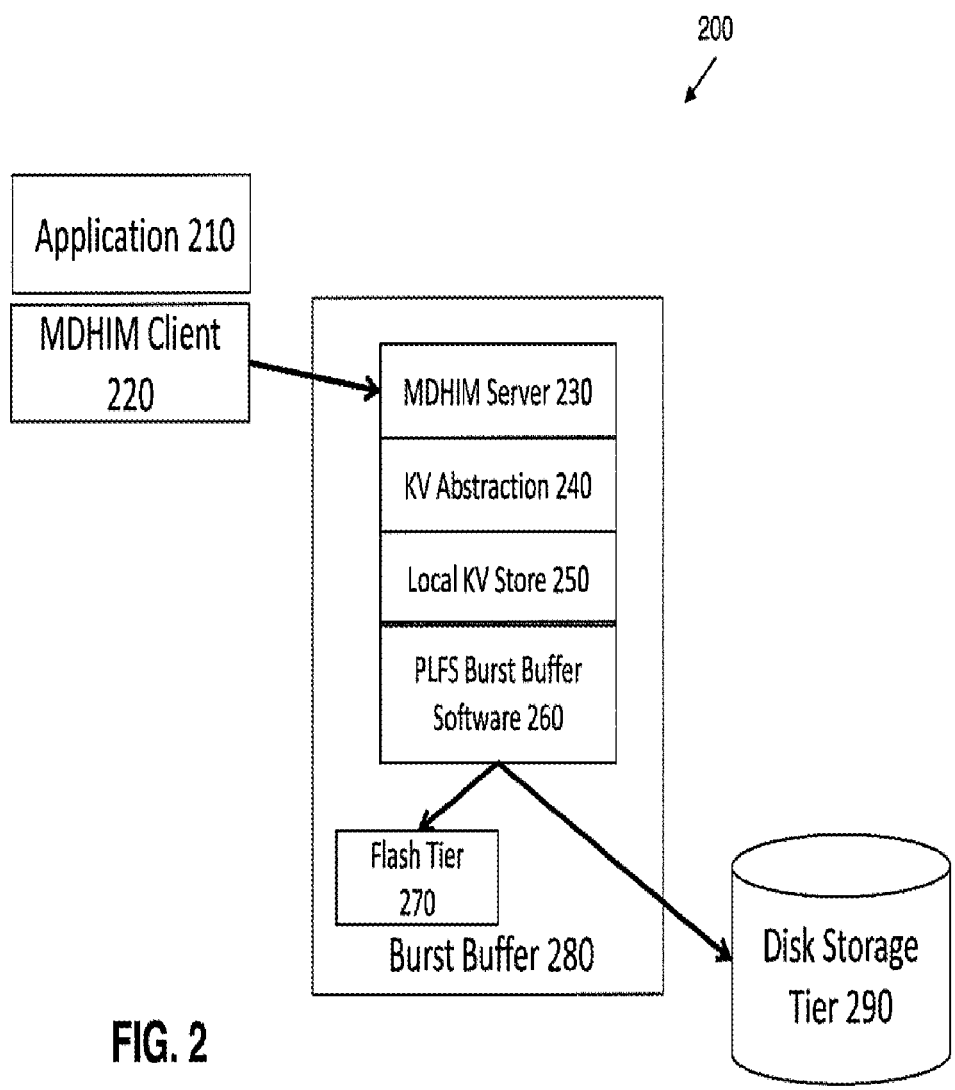
FIG. 2 illustrates an exemplary alternate partitioned key-value store incorporating aspects of the invention.

FIG. 2 illustrates an exemplary alternate partitioned key-value store 200 incorporating aspects of the invention. Generally, in the embodiment of FIG. 2, the MDHIM server 230 executes on the burst buffer appliance 280. In this manner, MDHIM can be implemented in a high performance computing (HPC) environment in which the compute nodes 160 do not provide storage. In addition, when the MDHIM servers 230 execute on the burst buffer appliance 280, processing resources on the compute nodes 160 are not consumed by the MDHIM servers 230.

As shown in FIG. 2, the exemplary partitioned key-value store 200 comprises an exemplary application, such as application 210, that can read, write and/or query key-value data in the exemplary partitioned key-value store 200, using one or more MDHIM clients, such as the exemplary MDHIM client 220, in a similar manner to FIG. 1. One or more MDHIM servers, such as MDHIM server 230 executing on the burst buffer appliance 280, control the storage of key-value data using a key-value abstraction layer 240 and a local key-value store 250.

The exemplary burst buffer appliance 280 further comprises the PLFS burst buffer software 260 that provides access to an exemplary flash storage tier 270 and an exemplary disk storage tier 290, in a similar manner to FIG. 1. The exemplary flash storage tier 270 may be integrated within the burst buffer appliance 280, as shown in FIG. 2, or an external storage device.

Figure 3:
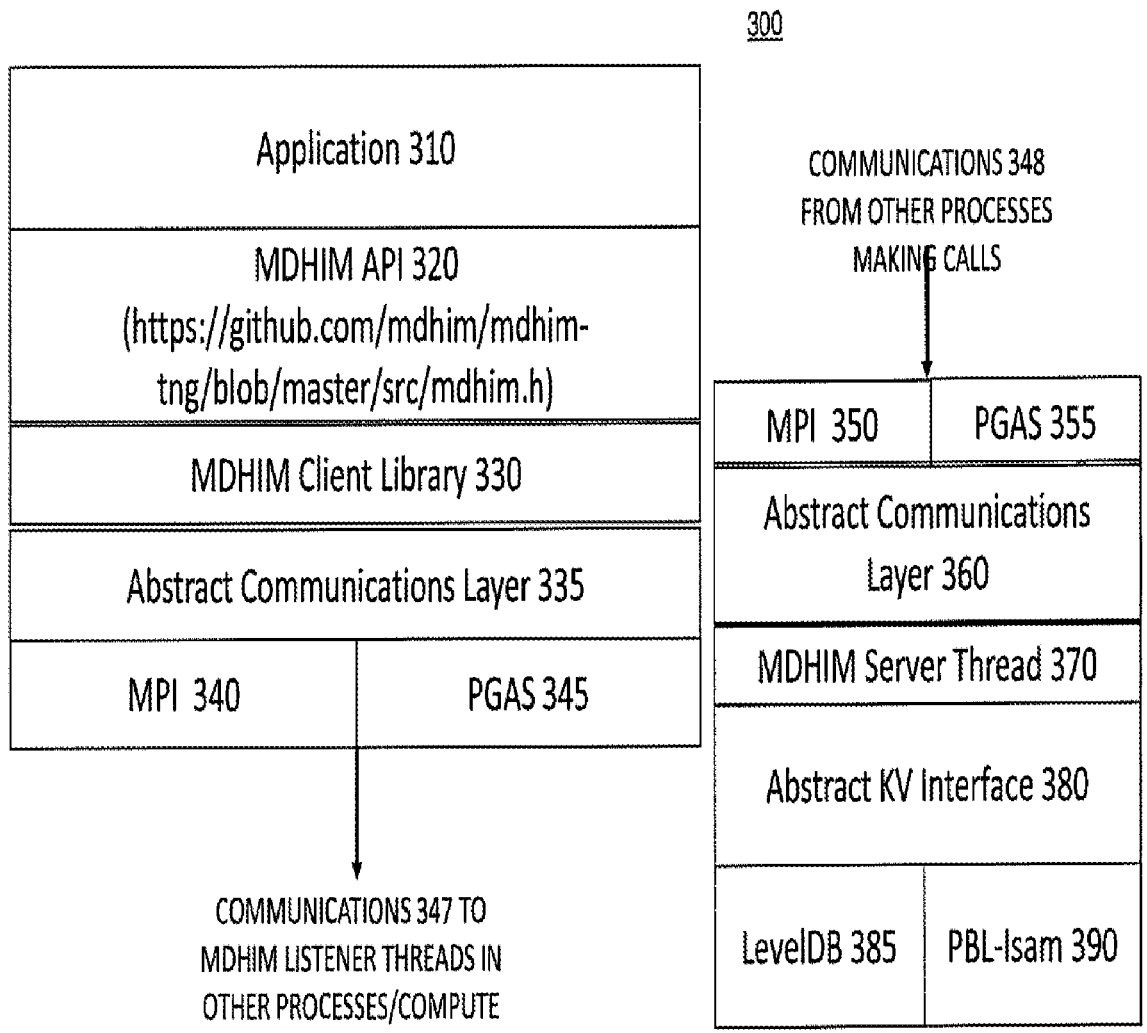
FIG. 3 illustrates an exemplary conventional architecture and application programming interface (API) for a Multidimensional Data Hashing Indexing Middleware (MDHIM) partitioned key-value store.

FIG. 3 illustrates an exemplary conventional architecture and application programming interface (API) for an MDHIM partitioned key-value store 300. Generally, an MDHIM framework employs one process address space, with the original process and the MDHIM listener thread in the same process space after the call to mdhim_init( ) which caused the MDHIM Listener thread to be spawned. Users run an MPI job and call mdhim_init( ) on every process/thread/MPI rank/compute node where an MDHIM server is desired.

MDHIM then spawns a listener thread to receive MDHIM communications 348 from other processes making calls to mdhim such as mdhim_get or mdhim_put. As discussed further below, subsequent calls to mdhim (such as mdhim_put or mdhim_get) then create an MPI unexpected message which is sent to one of the MDHIM servers. MDHIM can run as client/server where each compute node is running both an MDHIM client and an MDHIM server.

MDHIM communications 348 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a known manner.

Communications 347 to MDHIM Listener threads running in other processes/compute nodes are generated by an application 310 that provides messages to an MDHIM application programming interface (API) 320 using an MDHIM client library 330 and an abstract communications layer 335. Communications 347 are sent to other processes using the Message Passing Interface (MPI) 340 or PGAS 345.

The MDHIM application programming interface (API) 320 comprises the following exemplary operations:
- MDHIM init—initializes MDHIM structures and creates range server threads.
- MDHIM_PUT—put one or more keys in a data store
- MDHIM_GET—get one or more keys from the data store
- MDHIM insert—a list function that inserts new records with key and record data
- MDHIM flush—makes key distribution information available to MDHIM clients
- MDHIM find—find a record using primary key (match, best higher or lower) and set the absolute record number.
- MDHIM close—close an MDHIM file
- MDHIM read—a list function that read records (key and data), using absolute record numbers For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As previously indicated, an aspect of the invention sorts the local key-values locally by the local store and globally by the overall MDHIM framework. The local and global sorting can be leveraged to provide batch input/output (IO) operations that aggregate multiple requests into batch operations on one or more sorted ranges. In this manner, desired data can be obtained using a reduced number of messages over the network. For a more detailed discussion of key sorting techniques, see, for example, United States Patent Application entitled "Partitioned Key-Value Store With One-Sided Communications for Secondary Global Key Lookup by Range-Knowledgeable Clients," filed contemporaneously herewith and incorporated by reference herein.

Aspects of the present invention thus recognize that HPC applications typically will access contiguous sets of keys in parallel. Therefore, one process in an HPC job will access one sorted range and another will access a different sorted range. The global sort allows a better storage access pattern where each process only queries from a small set of the range server nodes. In addition, the local sort allows individual key requests to result in fewer storage operations.

Figure 4:
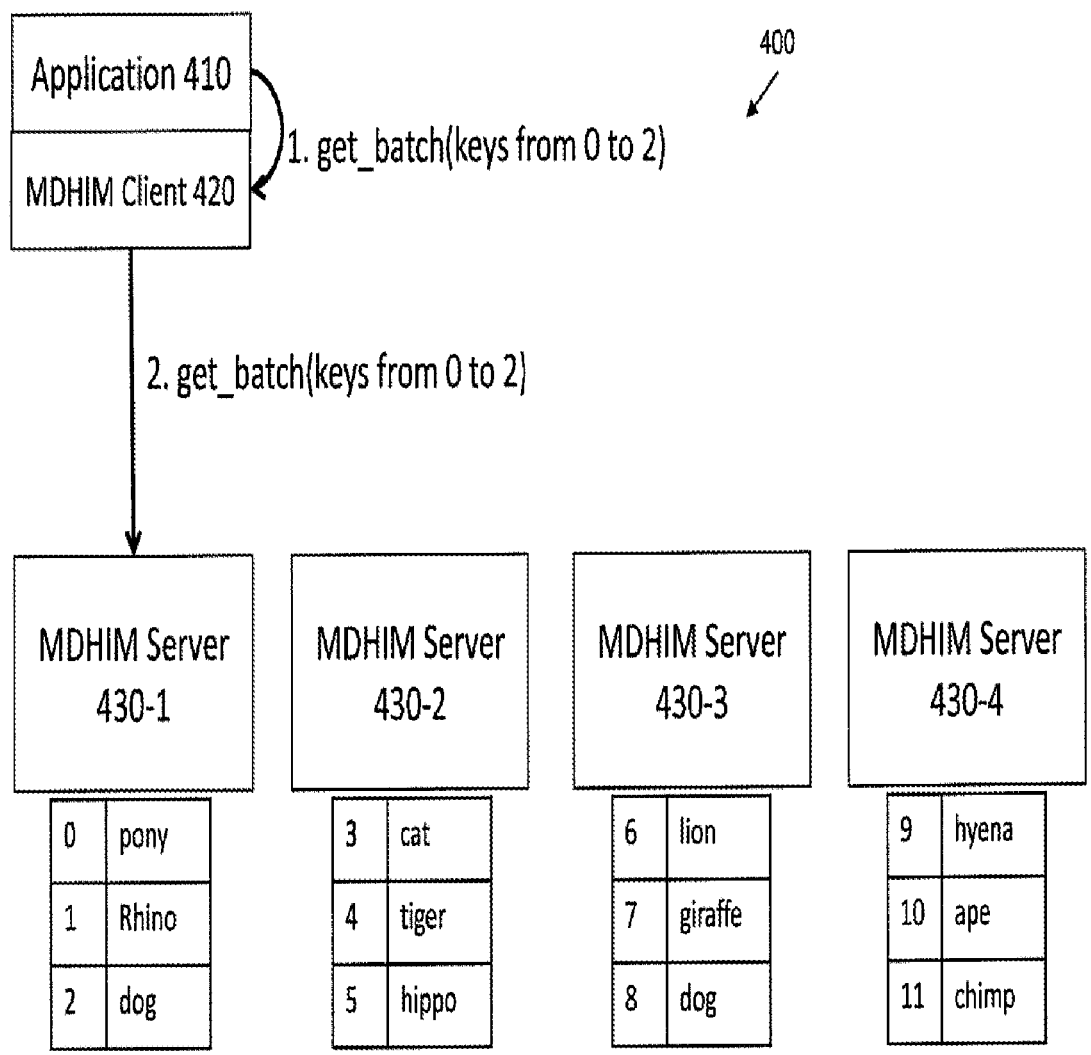
FIG. 4 illustrates the processing of a batch operation in an exemplary partitioned key-value store incorporating global sorting aspects of the invention.

FIG. 4 illustrates the processing of a batch operation in an exemplary partitioned key-value store 400 incorporating global sorting aspects of the invention. As shown in FIG. 4, the exemplary partitioned key-value store 400 comprises an exemplary application 410 that can read, write and/or query key-value data in the exemplary partitioned key-value store 400, using one or more MDHIM clients, such as the exemplary MDHIM client 420. One or more MDHIM servers 430-1 through 430-N(N is equal to 4 in the exemplary embodiment of FIG. 4) control the storage of key-value data.

The exemplary application 410 initially issues an aggregated "get batch" request to the client 420 during a first step, as follows:
get_batch(keys from 0 to 2)

The range-knowledgeable client 420 knows the keys in the range of 0-2 are stored by the first MDHIM server 430-1 and sends the get batch request to the appropriate server 430-1 during a second step, as follows:
get_batch(keys from 0 to 2)

In this manner, multiple requests are aggregated into "batches" to send fewer messages over the network.

Without a global sort, even if the application knows that it wants a sorted batch of keys, the MDHIM client must break this into multiple small individual requests to a large number of servers. The global sort provided by the present invention allows the single requests from the application 410 to the client 420 to become a single request over the network between one client 420 and one server 430-1.

Figure 5:
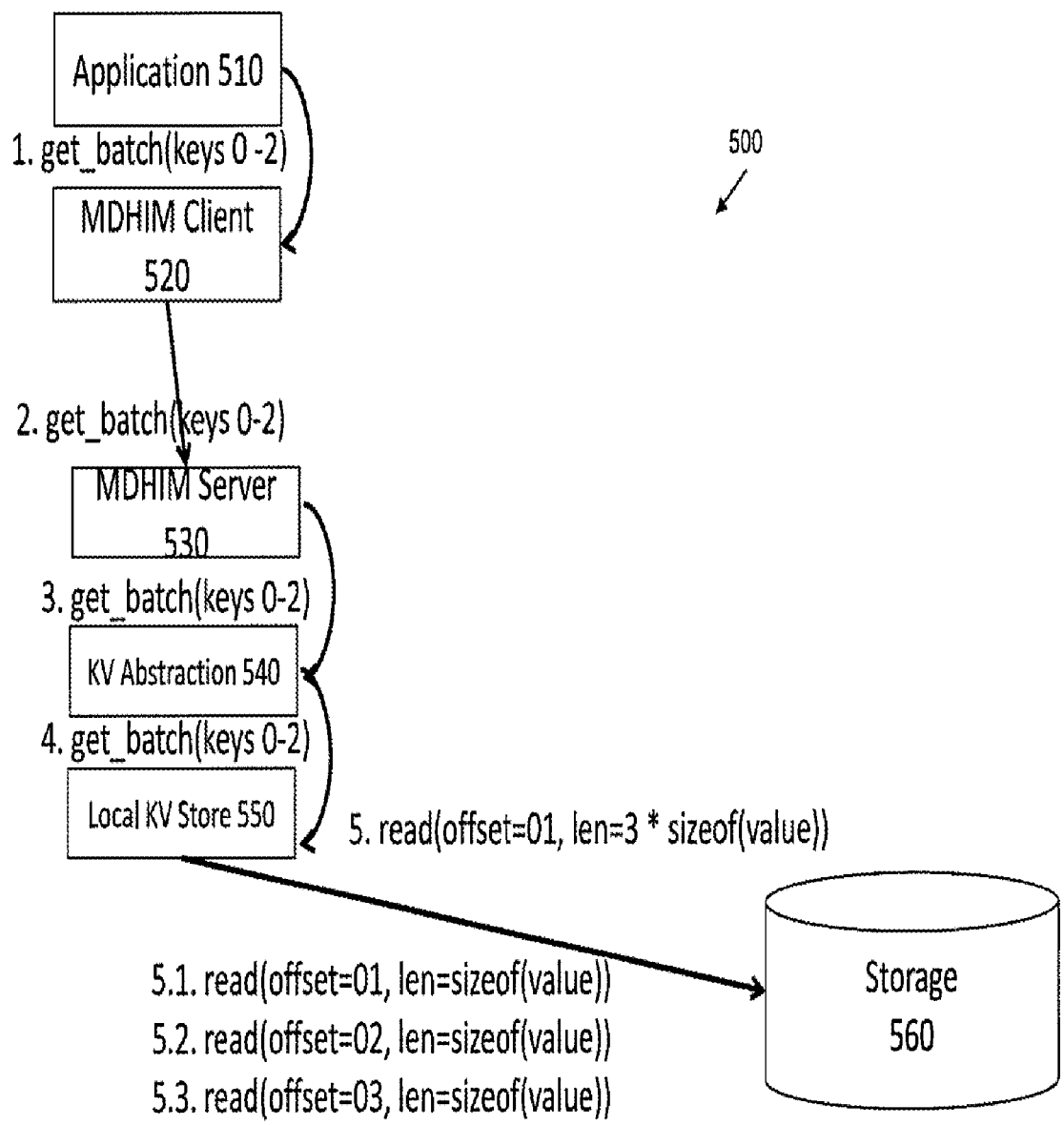
FIG. 5 illustrates the processing of another batch operation in an exemplary partitioned key-value store incorporating local sorting aspects of the invention.

FIG. 5 illustrates the processing of another batch operation in an exemplary partitioned key-value store 500 incorporating local sorting aspects of the invention. As shown in FIG. 5, the exemplary partitioned key-value store 500 comprises an exemplary application 510 that can read, write and/or query key-value data in the exemplary partitioned key-value store 500, using one or more MDHIM clients, such as the exemplary MDHIM client 520. One or more MDHIM servers, such as MDHIM server 530, control the storage of key-value data.

The exemplary application 510 initially issues an aggregated "get batch" request to the client 520 during a first step, as follows:
get_batch(keys from 0 to 2)

The range-knowledgeable client 520 knows the keys in the range of 0-2 are stored by the MDHIM server 530 and sends the get batch request to the appropriate server 530 during a second step, as follows:
get_batch(keys from 0 to 2)

The range-knowledgeable client 520 employs a key-value abstraction 540 and a local key-value store 550 to access the key-value data. The MDHIM server 530 stores the logical table but physically the local key-value store 550 is storing the data for this logical table on a storage device 560, such as a disk. According to one aspect of the invention, the local key-value stores 550 are internally sorted so that the local KV store 550 will issue fewer requests to the storage device 560. When the local key-value store 550 does not store sorted key-values, the following requests are issued during step 5:

5.1. read(offset=01, len=sizeof(value))
5.2. read(offset=02, len=sizeof(value))
5.3. read(offset=03, len=sizeof(value))

Thus, there are 3 random reads to the actual storage device 560 with conventional techniques.

When a sorted local key-value store 550 is used in accordance with the present invention, only the following single request is issued during step 5:

5. read(offset=01, len=3*sizeof(value))

Figure 6:
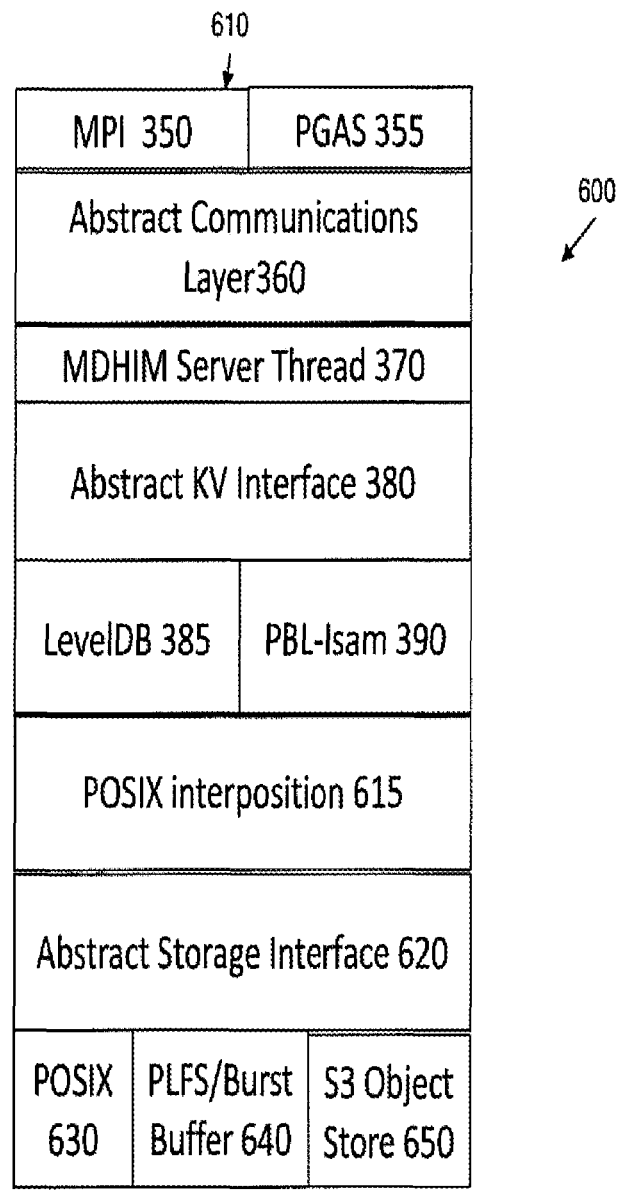
FIG. 6 illustrates the MDHIM layers for processing communications from other processes making calls in accordance with a storage architecture interface aspect of the invention.

FIG. 6 illustrates the MDHIM layers 600 for processing communications 610 from other processes making calls in accordance with a storage architecture interface aspect of the invention. As discussed above in conjunction with FIG. 3, MDHIM spawns a listener thread to receive MDHIM communications 610 from other processes making calls to mdhim such as mdhim_get or mdhim_put. MDHIM communications 610 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

A Portable Operating System Interface (POSIX) is a family of IEEE standards for maintaining compatibility between operating systems. POSIX defines the application programming interface (API), along with command line shells and utility interfaces, for software compatibility with variants of Unix and other operating systems. Thus, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650. The abstract storage interface 620 performs the necessary conversions/translations to leverage a burst buffer and object stores.

In this manner, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

Figure 7:
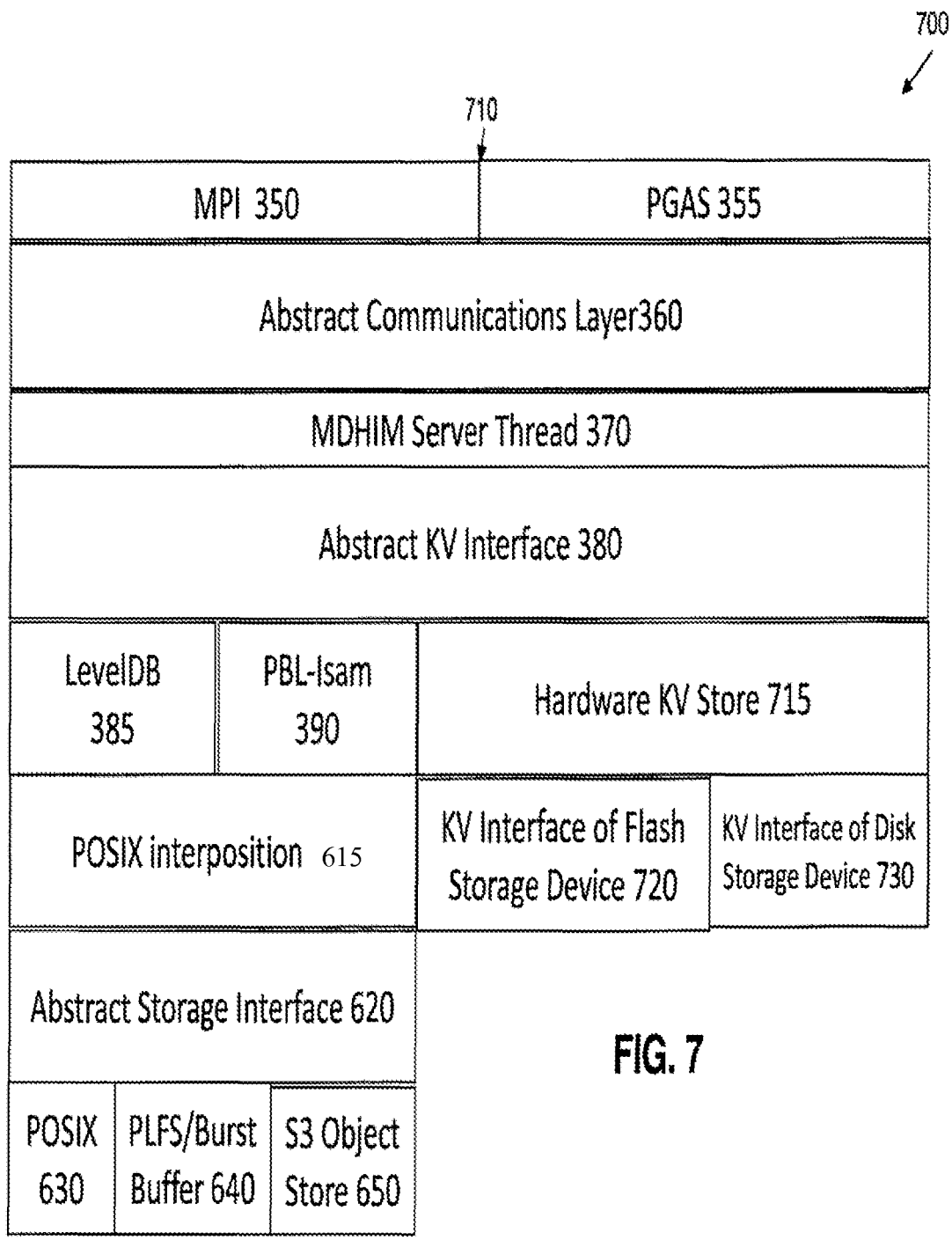
FIG. 7 illustrates the MDHIM layers for processing communications 710 from other processes making calls in accordance with a hardware key-value store interface aspect of the invention.

FIG. 7 illustrates the MDHIM layers 700 for processing communications 710 from other processes making calls in accordance with a hardware key-value store interface aspect of the invention. As discussed above in conjunction with FIG. 3, MDHIM spawns a listener thread to receive MDHIM communications 710 from other processes making calls to mdhim such as mdhim_get or mdhim_put. MDHIM communications 710 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

In addition, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650, in a similar manner to FIG. 6.

The Abstract KV Interface 380 also provides an interface to a hardware key-value Store 715, connected to a key-value interface 720 of a flash storage device and/or a key-value interface 730 of a disk storage device.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of a partitioned key-value store 100 and burst buffer appliance 190 as disclosed herein can be implemented at least in part in the form of one or more software programs stored in memory and executed by a processor of a processing device. A memory having such program code embodied therein is an example of what is more generally referred to herein as a "computer program product."

The partitioned key-value store 100, burst buffer appliance 190 or portions thereof may be implemented using one or more processing platforms each comprising a plurality of processing devices. Each such processing device may comprise processor, memory and/or network interface components.

As indicated above, multi-tier storage of key-value data such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the secondary global key look-up functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

Advanced Metadata Management

In many embodiments the current disclosure may enable a data management module to manage multi-dimensional metadata stored within a HPC environment. In various embodiments, an I/O Dispatcher module may be a data management module which may create metadata about objects, containers, and/or events stored within a data storage system. In certain embodiments, an I/O Dispatcher module may be enabled to utilize a distributed metadata KV store, such as MDHIM. In other embodiments, an I/O Dispatcher module may manage metadata in the form of a list of burst buffers across which each portion of data is stored. In some embodiments, an I/O Dispatcher may be enabled to manage metadata received from two or more sources.

In many embodiments, a HPC environment including burst buffer appliances may enable a HPC environment to manage data storage and associated metadata in a distributed manner. In various embodiments, a burst buffer appliance may include a data management module coupled with a distributed Key-Value (KV) store which may enable the data management module to manage, create, distribute and/or retrieve efficiently metadata which may be distributed through a HPC environment. In certain embodiments, a HPC environment may use MDHIM as its distributed Key-Value (KV) store. In some embodiments, a data management module may enable a HPC Environment to separate metadata tables for objects, containers, transactions, and other metadata created within the HPC Environment. In many embodiments, MDHIM may enable sharding for metadata (i.e. object, containers, transactions, and/or other metadata). In certain embodiments, metadata may be split into two or more key spaces of equally sized ranges and may be distributed to two or more MDHIM servers. In various embodiments, splitting metadata among two or more key spaces may enable processing of smaller metadata stores, which in term may enable more efficient management, storage, distribution and/or retrieval of metadata from a KV store. In certain embodiments, a HPC environment may have a uniform load-balanced distribution of metadata across MDHIM servers. In many embodiments, sharding for metadata may create a large number of small ranges such that each server may server many ranges. In various embodiments, sharding of metadata may be dynamically rearranged to fix poorly balanced distributions.

In many embodiments, an I/O Dispatcher module may manage metadata in the form of checksum unit size and stripe size for when an object may persisted off a burst buffer. In some embodiments, metadata may include layout information for the data in each respective burst buffer. In various embodiments, metadata may include transactional information about each object, such as in which transaction associated data may have been created, may have been unlinked, and/or the last offset of each object.

In many embodiments, a burst buffer appliance may include an I/O dispatcher, MDHIM Server, and/or a flash storage buffer enabled to support management of data I/Os received from one or more compute nodes. In various embodiments, an I/O Dispatcher may include a MDHIM Client which may be used to manage metadata created by the I/O Dispatcher relating to received data I/Os. In certain embodiments, a burst buffer appliance may be in communication with one or more compute nodes. In some embodiments, a compute node may include a MDHIM client module which may enable the compute node to create, manage, and/or modify user created metadata. In many embodiments, the current disclosure may enable a HPC environment to utilize an I/O Dispatcher to manage local metadata and external user created metadata.

In various embodiments, a compute node may be enabled to create Key-Value entries within a MDHIM server on a burst buffer appliance. In certain embodiments, a compute node may be enabled to combine a key and a TID in a user request as a complete MDHIM key, (i.e. {key,tid}). In other embodiments, an I/O Dispatcher may export an API for the MDHIM Server to enable users to set and/or get key-value pairs. In some embodiments, an I/O Dispatcher's interface may store an index file of user keys to MDHIM keys.

In an embodiment, a compute node may use the following command to set and get user defined key-values from a key value store on a burst buffer appliance.

| User command | I/O Dispatcher |
| --- | --- |
| Set(key = "Name", tid = 6, value = "Alex") | Mdhim_set("Name6", "Alex") |
| Get(key = "Name", tid = 6) | Mdhim_get("Name6") |

In this embodiment, an I/O Dispatcher is enabled to translate between a user command and a MDHIM command. For example, in this embodiment, the user set command includes the key "Name", the tid "6", and the value "Alex." I/O Dispatcher is enabled to convert the key, tid, and value to an equivalent MDHIM command having a key of "Name6" and value of "Alex."

In many embodiments, an I/O Dispatcher may be enabled to create and/or manage an index table of objects stored within each MDHIM Server. In various embodiments, an index table may include a key-value paring of keys and TID.

In many embodiments, an index table may be a small ISAM data base for each object of a MDHIM server. In various embodiments, an index table may be built on top of ISAM and contain two fields, the primary key and TID lists. In certain embodiments, a primary key may be the same key as provided by a user (i.e. {key, tid, value}). In some embodiments, the TID list may be a list of TIDs at which corresponding keys have been created, updated and/or unlinked.

In an embodiment, the following table is an example of an Index table used by an I/O Dispatcher to reference user keys and TIDs.

| Key | Value |
| --- | --- |
| Name | 6, 8, 12 |

In this embodiment, a determination can be made that the key "Name" is created/updated/uplinked at TID 6, 8, and 12. As shown, if a user issues the command "get("Name", tid=9), based on the index table, the value returned should be located at "Name8." If a user issues the command "IOD_purge(tid=9)," then records "Name6" and "Name8" should be deleted from the burst buffer appliance.

Figure 8:
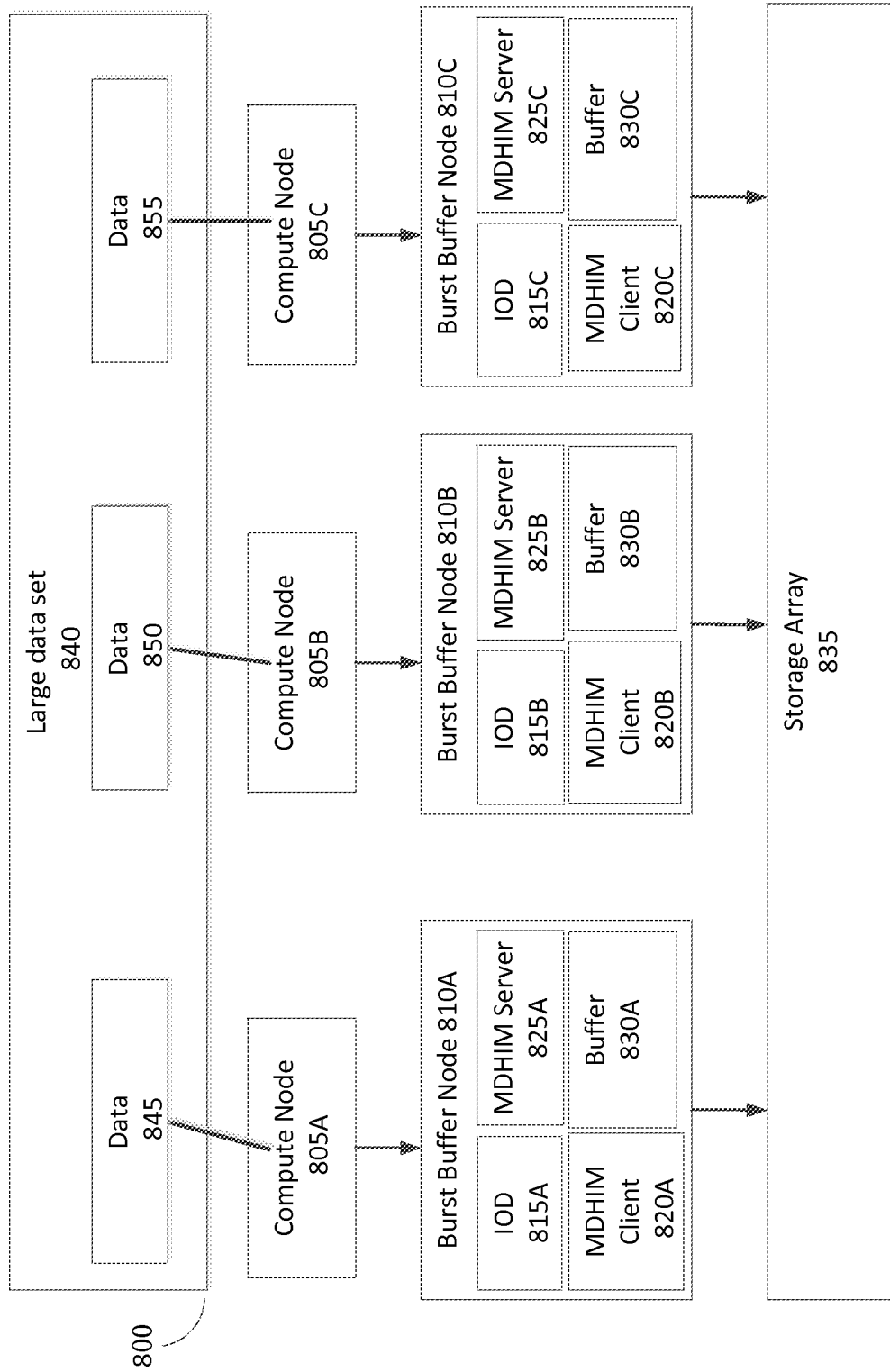
FIG. 8 is a simplified illustration of a High Performance Computing (HPC) Environment, in accordance with an embodiment of the current disclosure.

Refer to the example embodiment of FIG. 8. FIG. 8 is a simplified illustration of a High Performance Computing (HPC) Environment, in accordance with an embodiment of the current disclosure. HPC Environment 800 includes compute node (805A-C, 805 generally), burst buffer node (810A-C, 810 generally), and data storage array 835. Burst buffer node 810A includes data management module 815A, MDHIM client 820A, MDHIM Server 825A, and Flash Buffer 830A. Burst buffer node 810B includes data management module 815B, MDHIM client 820B, MDHIM Server 825B, and Flash Buffer 830B. Burst buffer node 810C includes data management module 815C, MDHIM client 820C, MDHIM Server 825C, and Flash Buffer 830C. Compute Node 805A is in communication with Burst Buffer node 810A, which is in communication with Data storage Array 835. Compute Node 805B is in communication with Burst Buffer node 810B, which is in communication with Data storage Array 835. Compute Node 805C is in communication with Burst Buffer node 810C, which is in communication with Data storage Array 835.

In this embodiment, large data set 840 is divided into smaller portions to enable more efficient processing by each compute node 805. As shown, data 845 is processed on compute node 805A. Data 850 is processed on compute node 805B. Data 855 is processed on compute node 805C. Data management modules 815 manage data received from compute node 805. Each burst buffer node 810 includes a MDHIM Server which enables each Burst Buffer Node 810 to manage a portion of metadata associated with data stored on burst buffer node 810 and/or data storage array 835. In this embodiment, each burst buffer node 810 is enabled to communicate with other burst buffer nodes including MDHIM Server 825 to enable creation, deletion, and/or management of metadata stored on each respective burst buffer node 810. For example, in an embodiment, MDHIM Server 825A stores metadata related to objects, MDHIM Server 825B stores metadata related to containers, and MDHIM Server 825C stores metadata related to checkpoints and transactions. In this embodiment, each burst buffer node 810 includes a MDHIM Client (820A-C, 820 generally) enabled to communicate which each respective MDHIM Server (825A-C) to create, delete, retrieve, and/or manage metadata stored in each respective MDHIM Server (825A-C). A request to retrieve object metadata would be sent to MDHIM Server 825. A request to retrieve container metadata would be sent to MDHIM Server 825B. A request to retrieve checkpoint and/or transaction metadata would be sent to MDHIM Server 825C. In FIG. 8, data management module 815 is enabled to communicate with other data management modules to coordinate and/or synchronize data, transactions, checkpoints, and/or events stored at data management module 815.

Figure 9:
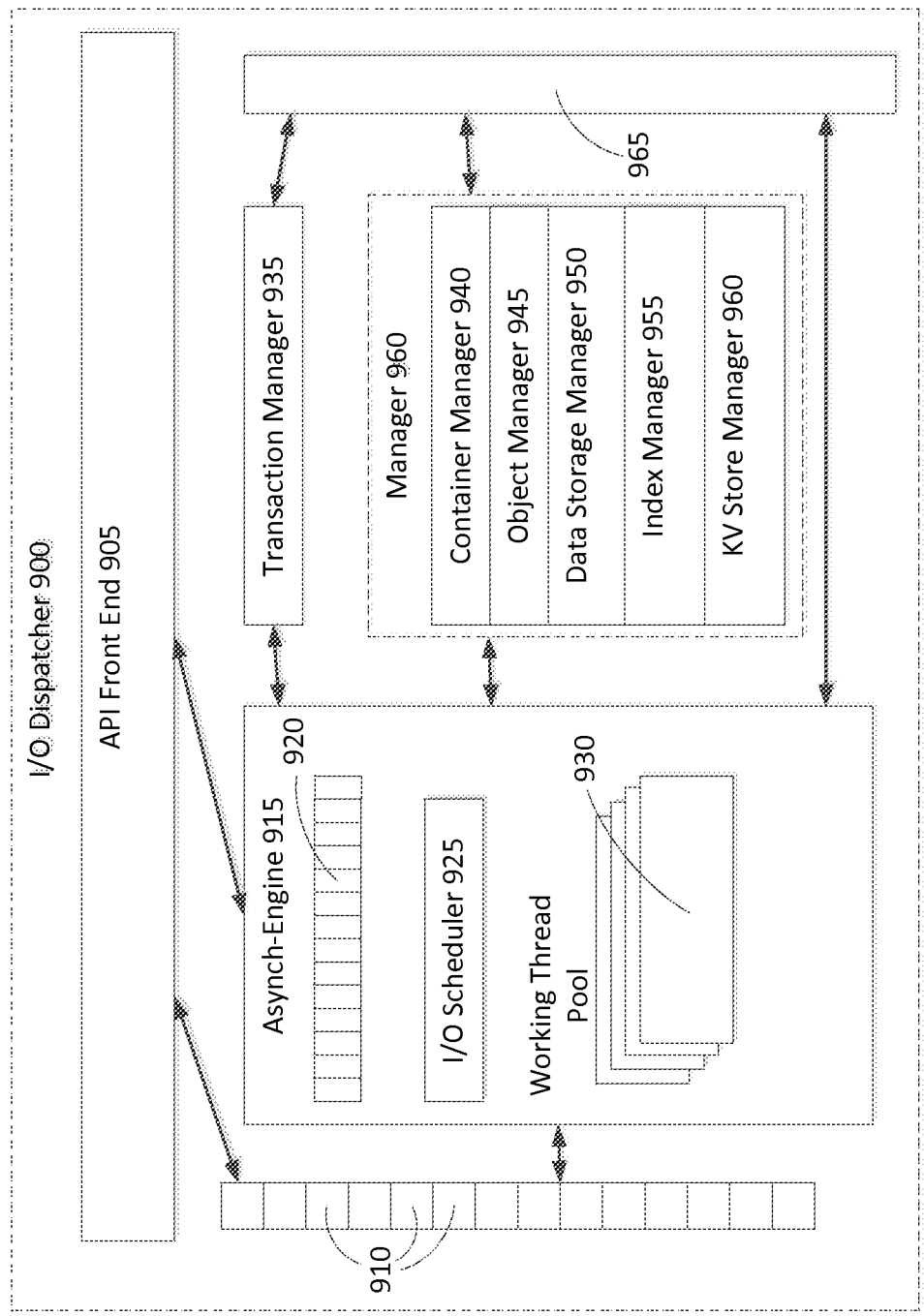
FIG. 9 is a simplified illustration of an I/O Dispatcher as used in a burst buffer appliance in a HPC Environment, in accordance with an embodiment of the present disclosure.

Refer to the example embodiment of FIG. 9. FIG. 9 is a simplified illustration of an I/O Dispatcher as used in a burst buffer appliance in a HPC Environment, in accordance with an embodiment of the present disclosure. As shown, I/O Dispatcher 900 includes API Front End 905, task queue 910, Asynchronous Engine 915, transaction manager module 935, Manager module 960, and inter-I/O Dispatcher communication module 965. Asynchronous engine 915 includes event queue 920, I/O Scheduler 925. Asynchronous engine 915 is enabled to manage one or more threads in the working thread pool 930. Manager module 960 includes container manager 940, object manager 945, data storage manager 950, index manager 955, and KVStore manager 960. API Front End 905 enables access to task queue 910 and asynchronous engine 915. Asynchronous engine 915 manages transaction manager 935, manager module 960, and Inter I/O Dispatchers Communication module 965. In this embodiment, KV Store manager 960 enables management of a connection with one or more KV Stores. Index Manager 955 manages an index table of keys to TIDs. Data storage manager 950 is enabled to manage data storage in communication with I/O Dispatcher.

In this embodiment, I/O Dispatcher is enabled to communicate with a flash storage buffer on a burst buffer appliance and a data storage array in communication with the burst buffer appliance. Inter-I/O Dispatcher Communications module 965 is enabled to communicate with I/O Dispatcher modules on other burst buffer appliances. In this embodiment, API Front end 905 is enabled to provide access to one or more features of I/O Dispatcher 900.

In various embodiments, an I/O Dispatcher module may include a transaction manager module, a container Manager module, and an inter data management communication module to enable distributed asynchronous transactions. In certain embodiments, a transaction manager may be enabled to provide transaction semantics. In other embodiments, a transaction manager may be enabled to manage one or more specific transaction's status, which may be selected by hashing transaction ID. In some embodiments, a transaction's final status may be tracked by a container manager which may be selected by hashing a container path name. In many embodiments, an inter data management communication module may be used for communication between I/O Dispatcher modules. In various embodiments, an I/O Dispatcher module may have special threads listening for unexpected incoming MPI messages from sibling I/O Dispatcher modules, where the MPI messages have pre-defined message formats. In certain embodiments, communication between I/O Dispatcher modules may be based on MPI mechanisms.

In some embodiments, I/O Dispatcher modules may provide transaction semantics to other layers of a burst buffer, such as, but not all inclusive, atomic writes, concurrent writes, consistent reads, multiple objects, and/or multiple threads. In many embodiments, an atomic write may be defined as allowing all writes in a transaction to be applied or no writes in a transaction to be applied. In various embodiments, concurrent writes may be effectively applied according to Transaction ID order, not time order. In certain embodiments, consistent reads may enable reads to the HPC environment to access the same version of data even in the presence of concurrent writes. In some embodiments, I/O Dispatcher transactions may exist at a container level. In other embodiments, multiple objects may mean that any number of objects within one container may be written in the same transaction. In various embodiments, one or more threads and/or processes may participate in the same transaction.

In many embodiments, Data management modules on burst buffer nodes may be enabled to rebalance metadata storage on MDHIM Servers. In various embodiments, if one or more MDHIM Servers have a higher workload than other MDHIM Servers, the distributed workload may be modified to uniformly distribute a workload over all the MDHIM Servers. In other embodiments, if one or more MDHIM server may be particularly suited for managing a type of metadata (i.e., more processors available, faster hardware) metadata storage and/or workload may be adjusted to have a heavier workload on one or more specified MDHIM servers.

Figure 10:
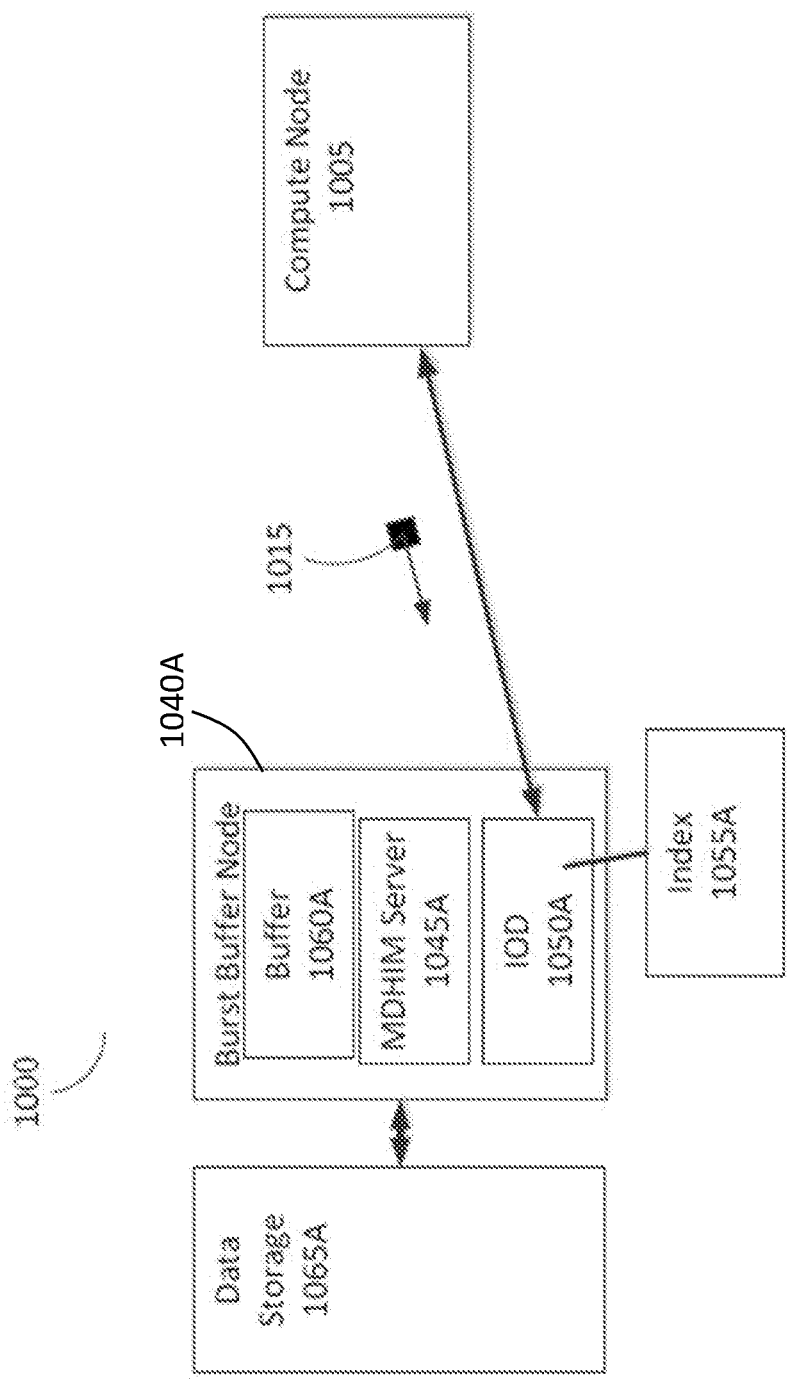
FIG. 10 is a simplified illustration of a compute node sending user-created metadata to be stored on a burst buffer node, in accordance with an embodiment of the present disclosure.

Refer to the example embodiment of FIG. 10. FIG. 10 is a simplified illustration of a compute node sending user-created metadata to be stored on a burst buffer node, in accordance with an embodiment of the present disclosure. As shown, HPC Environment 1000 includes compute node 1005, Burst Buffer node 1040A, and data storage array 1065A. Compute node 1005 is in communication with burst buffer node 1040A. Burst buffer node 1040A is in communication with Data storage array 1065. Burst buffer node 1040A includes MDHIM Server 1045A, I/O Dispatcher module 1050A, and flash storage buffer 1060A. MDHIM Server 1045A is enabled to store metadata in HPC Environment 1000. In this embodiment, compute node 1005 sends data and user-created metadata (i.e., {key, tid, value}) to I/O Dispatcher 1050A using message 1015. I/O Dispatcher 1050A translates user-created metadata to MDHIM metadata and stores the MDHIM metadata in MDHIM Server 1045A. I/O Dispatcher 1050A updates Index 1055A with key-TID pair{Key, TID}. I/O Dispatcher 1050A stores data in flash storage buffer 1060A. In many embodiments, metadata and/or data stored within a HPC Environment may be synchronized by storing and/or indexing key-value including Transaction IDs. In various embodiments, one or more I/O Dispatchers on one or more burst buffer appliances may enable a HPC Environment to process portions of a large data set asynchronously and may enable a user to merge the portions of the large data set into the large data set using transaction IDs.

Figure 11:
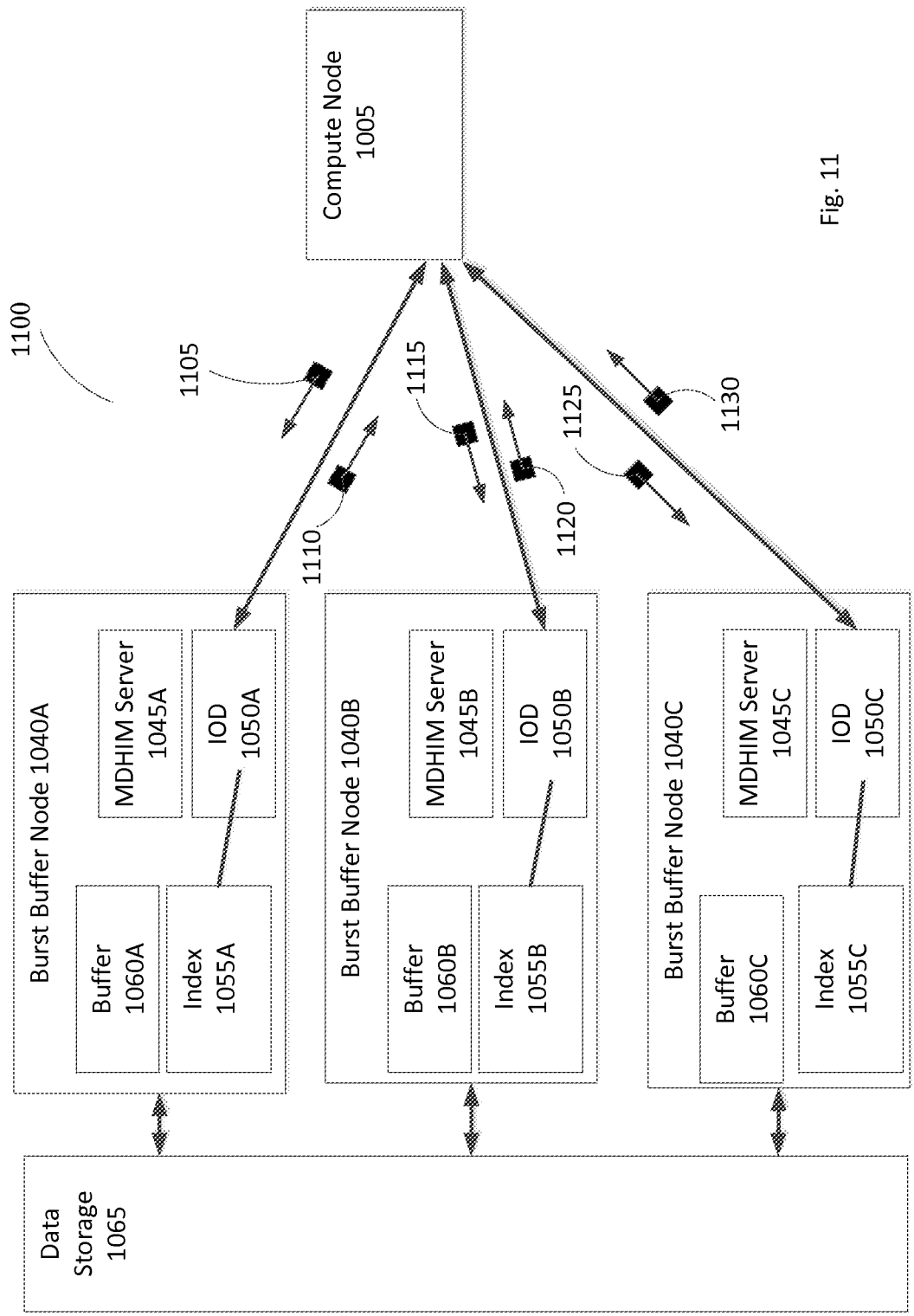
FIG. 11 is a simplified illustration of retrieving data in a HPC environment, in accordance with an embodiment of the present disclosure.

Refer to the example embodiment of FIG. 11. FIG. 11 is a simplified illustration of retrieving data in a HPC environment, in accordance with an embodiment of the present disclosure. As shown, HPC Environment 1100 includes compute node 1005, burst buffer node 1040A, 1040B, 1040C, and Data storage array 1065. Compute node 1005 is in communication with burst buffer nodes 1040A, 1040B, 1040C. Burst buffer node 1040A is in communication with data storage 1065, Burst buffer node 1040B is in communication with data storage array 1065, and Burst buffer node 1040C is in communication with data storage array 1065.

Burst buffer 1040A includes MDHIM Server 1045A, Flash storage buffer 1060A, and I/O Dispatcher 1050A. Burst buffer 1040B includes MDHIM Server 1045B, Flash storage buffer 1060B, and I/O Dispatcher 1050B. Burst buffer 1040C includes MDHIM Server 1045C, Flash storage buffer 1060C, and I/O Dispatcher 1050C. Compute node 1005 sends requests to burst buffer nodes 1040A, 1040B, 1040C using messages 1105, 1115, 1125. Message 1105 contains request for data object 1 of TID1. Message 1115 contains request for data object 2 of TID1. Message 1125 contains request for data object 3 of TID1.

I/O Dispatcher 1050A receives message 1105 and queries index 1055A for TID1 version of data object 1 and uses information to retrieve data object 1 of TID1 from MDHIM Server 1045A. I/O Dispatcher 1050A sends data object 1 of TID 1 to compute node 1005 using message 1110. I/O Dispatcher 1050B receives message 1115 and queries index 1055B for TID1 version of data object 2 and uses information to retrieve data object 2 of TID1 from MDHIM Server 1045B. I/O Dispatcher 1050B sends data object 2 of TID 1 to compute node 1005 using message 1120. I/O Dispatcher 1050C receives message 1125 and queries index 1055C for TID1 version of data object 3 and uses information to retrieve data object 3 of TID1 from MDHIM Server 1045C. I/O Dispatcher 1050C sends data object 3 of TID 1 to compute node 1005 using message 1130.

Figure 12:
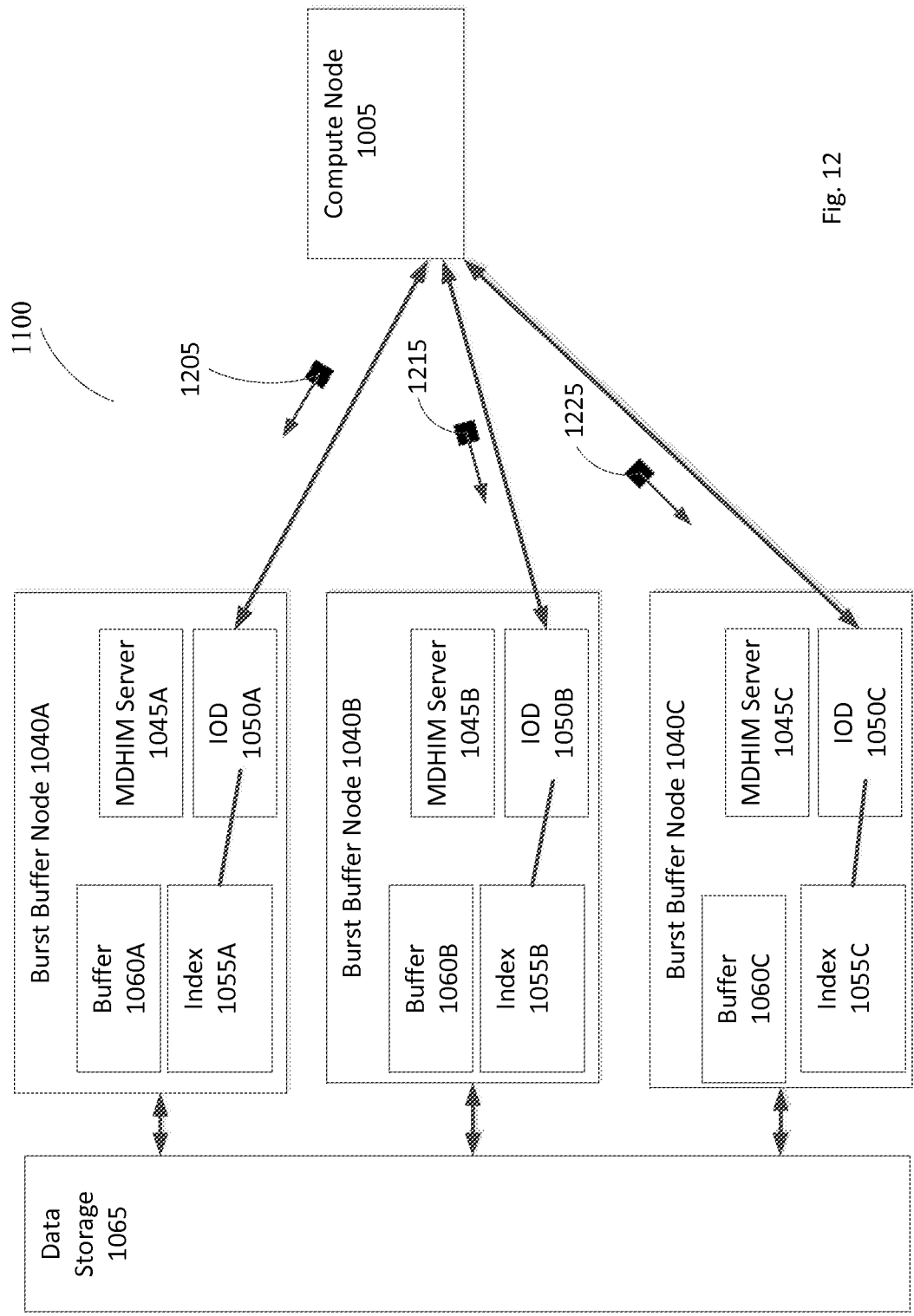
FIG. 12 is a simplified illustration of a compute node purging data in a HPC environment, in accordance with an embodiment of the present disclosure.

Refer to the example embodiment of FIG. 12. FIG. 12 is a simplified illustration of a compute node purging data in a HPC environment, in accordance with an embodiment of the present disclosure. As shown, Burst buffer nodes 1040A, 1040B, 1040C are storing data associated with TIDs {1,2, 3,4,5,6,7}. Compute node 1005 sends the command I/O Dispatcher Purge(TID=4) to burst buffer nodes 1040A, 1040B, 1040C using messages 1205, 1215, 1225.

I/O Dispatcher 1050A receives message 1205 and queries index 1055A to determine which TIDs and associated data is requested to be purged. I/O Dispatcher 1050A determines that data associated with TIDs {1,2,3,4} are stored on burst buffer node 1040A. I/O Dispatcher 1050A purges data associated with TIDs {1,2,3,4} using MDHIM Server 1045A. I/O Dispatcher 1050B receives message 1215 and queries index 1055B to determine which TIDs and associated data is requested to be purged. I/O Dispatcher 1050B determines that data associated with TIDs {1,2,3,4} are stored on burst buffer node 1040B. I/O Dispatcher 1050B purges data associated with TIDs {1,2,3,4} using MDHIM Server 1045B. I/O Dispatcher 1050C receives message 1225 and queries index 1055C to determine which TIDs and associated data is requested to be purged. I/O Dispatcher 1050C determines that data associated with TIDs {1,2,3,4} are stored on burst buffer node 1040C. I/O Dispatcher 1050C purges data associated with TIDs {1,2,3,4} using MDHIM Server 1045C.

Figure 13:
FIG. 13 is a simplified illustration of a state diagram in a HPC Environment, in accordance with an embodiment of the present disclosure.

Refer to the example embodiment of FIG. 13. FIG. 13 is a simplified illustration of a state diagram in a HPC Environment, in accordance with an embodiment of the present disclosure. FIG. 13 shows transactions 1302, 1304, 1306, 1308, 1310 in a HPC environment. Each transaction 1302, 1304, 1306, 1308, 1310 designates a specified time during processing of data within a HPC Environment. In this embodiment, compute nodes 1312, 1314, 1316, 1318 are each processing a portion of a large data set. As shown, each portion being processed does not overlap. For example, compute node 1312 is processing a first data portion, compute node 1314 is processing a second data portion, compute node 1316 is processing a third data portion, and compute node 1318 is processing a forth data portion. In FIG. 13, compute nodes 1312, 1314, 1316, 1318 have not started processing any data.

Figure 14:
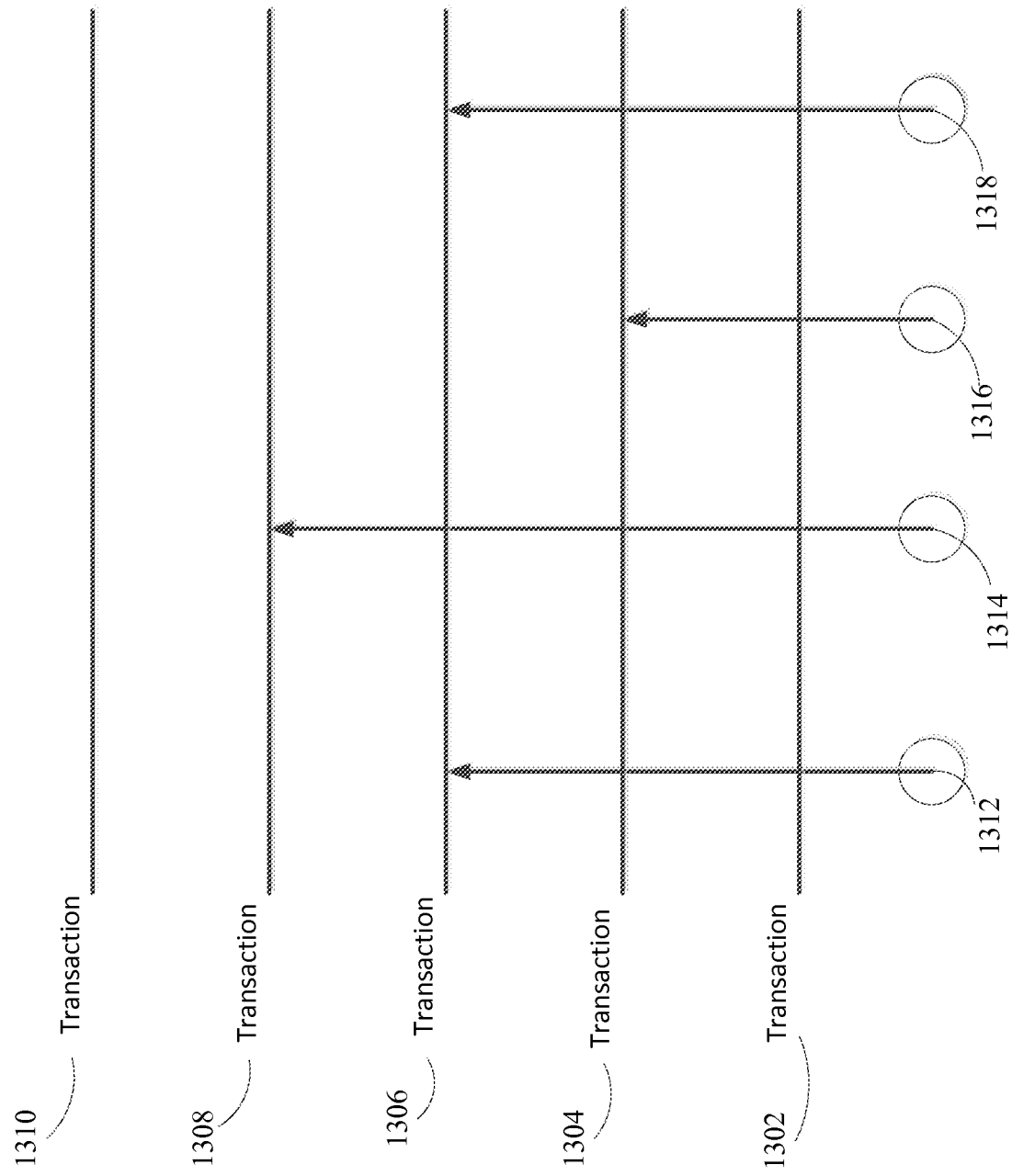
FIG. 14 is a simplified illustration of a state diagram of a HPC Environment, in accordance with an embodiment of the present disclosure.

Refer to the example embodiment of FIG. 14. FIG. 14 is a simplified illustration of a state diagram of a HPC Environment, in accordance with an embodiment of the present disclosure. In FIG. 14, compute nodes 1312, 1314, 1316, 1318 have asynchronously processed data in a HPC environment. As shown, compute node 1312 has completed processing through transaction 1306. Compute node 1314 has completed processing through transaction 1308. Compute node 1316 has completed processing through transaction 1304. Compute node 1318 has completed processing through transaction 1306. In this embodiment, the latest readable transaction is transaction 1304, as each of the compute nodes 1312, 1314, 1316, 1318 each have completed processing to transaction 1304.

Figure 15:
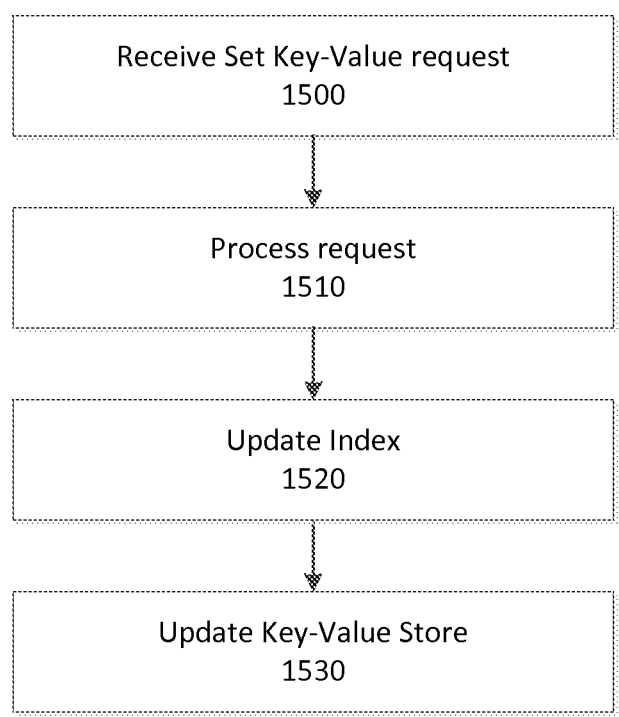
FIG. 15 is a simplified flowchart of a method of managing user-created metadata in a HPC Environment as shown in FIG. 10, in accordance with an embodiment of the present disclosure.

Refer to the example embodiment of FIGS. 10 and 15. FIG. 15 is a simplified flowchart of a method of managing user-created metadata in a HPC Environment as shown in FIG. 10, in accordance with an embodiment of the present disclosure. As shown, I/O Dispatcher 1050A receives set key-value request (Step 1500) command in message 1015 from compute node 1005. I/O Dispatcher 1050A processes request (Step 1510) by translating the request from user-created metadata to MDHIM metadata. I/O Dispatcher 1050A updates index 1055A (Step 1520) and updates MDHIM Server 1045A (Step 1530) with the MDHIM metadata.

Figure 16:
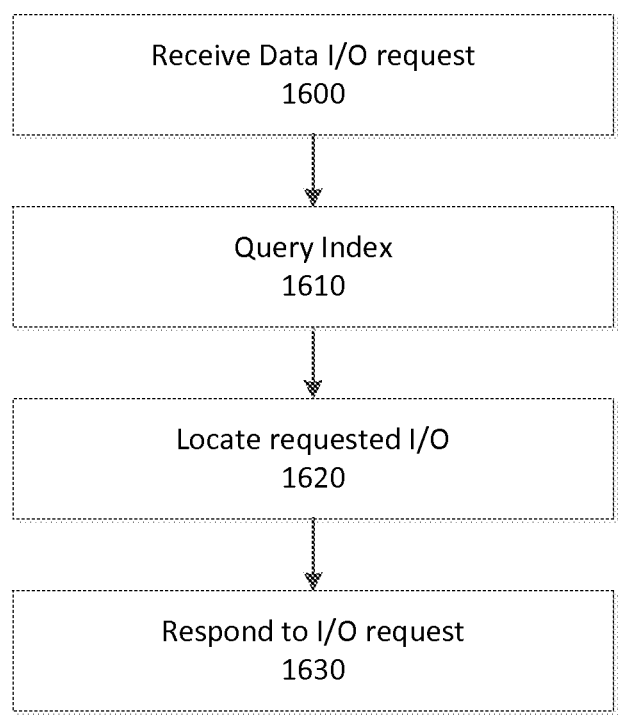
FIG. 16 is a simplified flowchart of a method of retrieving I/O in a HPC environment, in accordance with an embodiment of the present disclosure.

Refer to the example embodiment of FIGS. 11 and 16. FIG. 16 is a simplified flowchart of a method of retrieving I/O in a HPC environment, in accordance with an embodiment of the present disclosure. As shown, I/O Dispatcher 1050A receives message 1105 containing data I/O request (Step 1600). I/O Dispatcher 1050A queries index (Step 1610) to determine a TID for requested data I/O. I/O Dispatcher 1050A utilizes MDHIM Server 1045A and the TID to locate requested data I/O (Step 1620). I/O Dispatcher 1050A sends requested data I/O to compute node 1005 (Step 1630).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 17:
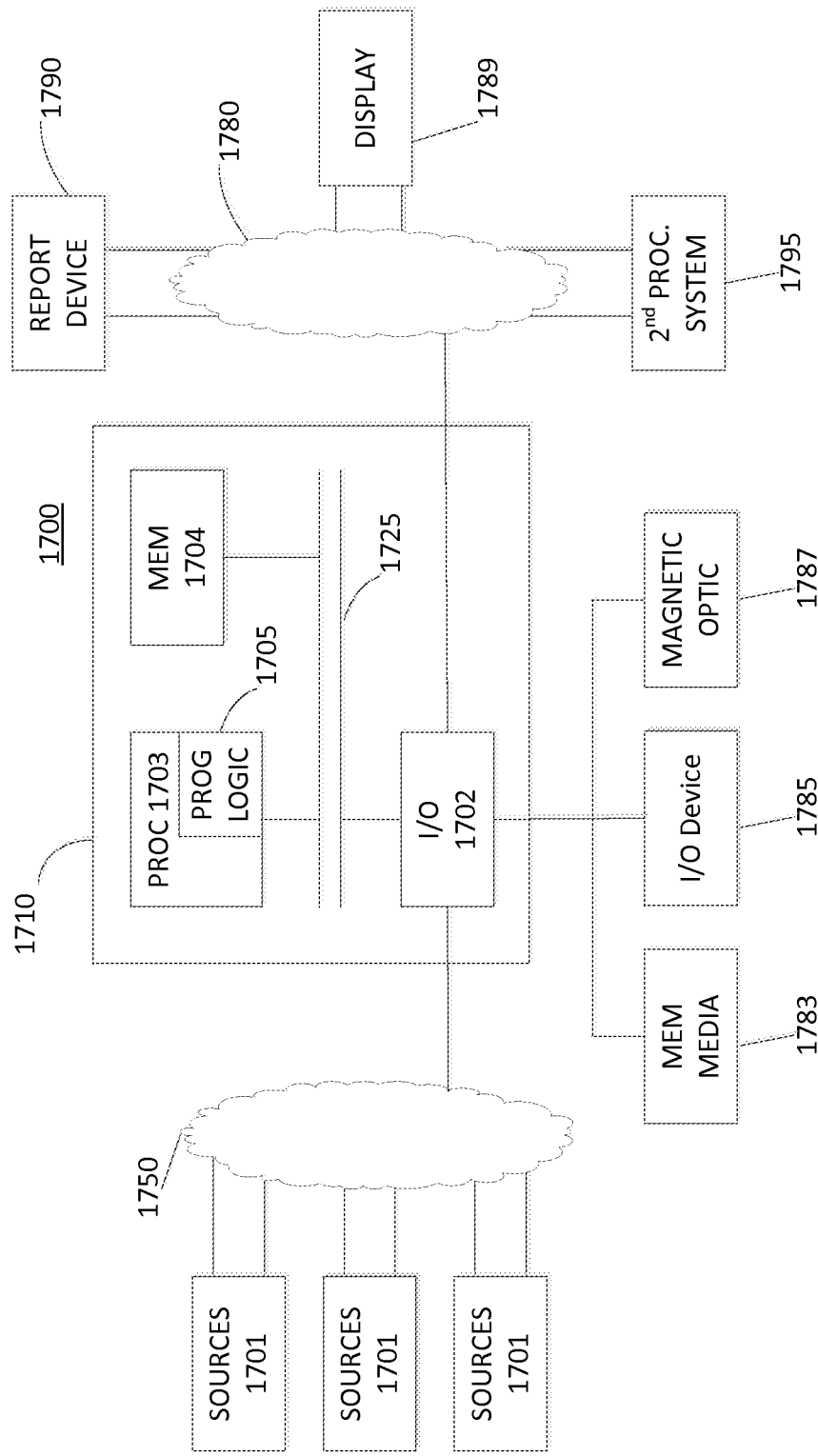
FIG. 17 is an example of an embodiment of an apparatus that may utilize the techniques described herein, in accordance with an embodiment of the present disclosure.

FIG. 17 is a block diagram illustrating an apparatus, such as a computer 1710 in a network 1700, which may utilize the techniques described herein according to an example embodiment of the present invention. The computer 1710 is configured interact with multiple data sources 1701 via a network 1750. The computer 1710 may include one or more I/O ports 1702, a processor 1703, and memory 1704, all of which may be connected by an interconnect 1725, such as a bus. Processor 1703 may include program logic 1705. The I/O port 1702 may provide connectivity to memory media 1783, I/O devices 1785, and drives 1787, such as magnetic or optical drives. The computer 1710 interfaces via a network 1780 with a report device 1790 and a display 1789. The computer 1710 also interfaces via the network 1780 with an additional processing system denoted as second processing system 1795. When the program code is loaded into memory 1704 and executed by the computer 1710, the machine becomes an apparatus for practicing the invention. When implemented on one or more general-purpose processors 1703, the program code combines with such a processor to provide a unique apparatus that operates analogously to specific logic circuits. As such, a general purpose digital machine can be transformed into a special purpose digital machine.

Figure 18:
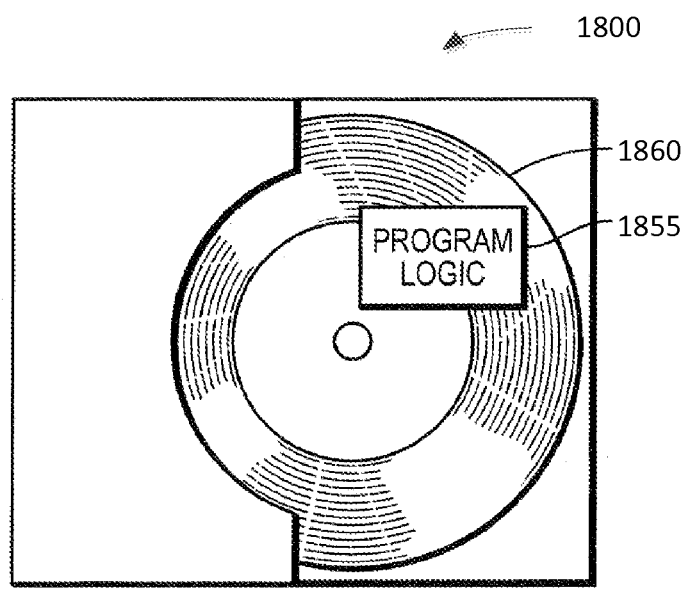
FIG. 18 is an example of a method embodied on a computer readable storage medium that may utilize the techniques described herein, in accordance with an embodiment of the present disclosure.

FIG. 18 is a block diagram illustrating a method embodied on a computer readable storage medium 1860 that may utilize the techniques described herein according to an example embodiment of the present invention. FIG. 18 shows Program Logic 1855 embodied on a computer-readable medium 1860 as shown, and wherein the Logic is encoded in computer-executable code configured for carrying out the methods of this invention and thereby forming a Computer Program Product 1800. Program Logic 1855 may be the same logic 1705 on memory 1704 loaded on processor 1703 in FIG. 17. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-18. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing metadata, using one or more processors and memory, in a distributed data storage system, wherein the distributed data storage system includes multiple burst buffers collectively providing a key-value store enabled to store metadata, the computer-executable method comprising:
   receiving, from a compute node, metadata related to data stored within the distributed data storage system;
   indexing the metadata from the compute node at a first one of the multiple burst buffers;
   splitting the metadata from the compute node into two or more key spaces;
   distributing the split metadata of the two or more key spaces to respective ones of two or more servers associated with respective other ones of the multiple burst buffers;
   wherein the two or more servers comprise two or more Multidimensional Data Hashing Indexing Middleware (MDHIM) servers associated with the respective other ones of the multiple burst buffers;
   receiving an aggregated request for a range of the split metadata;
   sending the aggregated request to a particular server of the two or more servers having the range of the split metadata;
   wherein the metadata from the compute node includes one or more transaction identifiers (TIDs);
   wherein a user request for the split metadata includes the one or more TIDs combined with one or more keys; and
   wherein the one or more keys are indexed according to one or more key-value parings of the one or more keys and the one or more TIDs; and
   converting the user request including the one or more TIDs and the one or more keys to an MDHIM command, wherein the aggregated request is based at least in part on the MDHIM command;
   wherein a plurality of input/output dispatchers are associated with the respective other ones of the multiple burst buffers; and
   wherein a given one of the plurality of input/output dispatchers is associated with a first burst buffer node and is configured:
      to convert the user request to the MDHIM command;
      to communicate with at least one input/output dispatcher of the plurality of input/output dispatchers associated with a second burst buffer node different from the first burst buffer node; and
      to dynamically reallocate storage of the split metadata between MDHIM servers associated with the first and second burst buffer nodes based on the communication.

2. The computer-executable method of claim 1, further comprising:
   receiving a metadata request from the compute node to purge metadata; and
   processing the metadata request.

3. The computer-executable method of claim 2, wherein the processing of the metadata request comprises:
   analyzing a metadata index to determine which portions of the metadata to purge; and
   purging the determined portions of the metadata.

4. The computer-executable method of claim 1, wherein the sending of the aggregated request is performed by one or more MDHIM clients with knowledge of which of the two or more servers has the range of the split metadata.

5. The computer-executable method of claim 1, wherein the aggregated request comprises a batch request including a range of keys.

6. The computer-executable method of claim 5, wherein the keys in the range are indexed with corresponding split metadata in a partitioned key-value store.

7. The computer-executable method of claim 1, wherein a first one of the MDHIM servers associated with the respective other ones of the multiple burst buffers stores metadata related to objects, a second one of the MDHIM servers associated with the respective other ones of the multiple burst buffers stores metadata related to containers and a third one of the MDHIM servers associated with the respective other ones of the multiple burst buffers stores metadata related to checkpoints and transactions.

8. A system, comprising:
a compute node;
a distributed data storage system in communication with the compute node, wherein the distributed data storage system includes multiple burst buffers collectively providing a key-value store enabled to store metadata; and
computer-executable program logic encoded in memory of one or more computers in communication with the distributed data storage system to enable management of metadata, using one or more processors and memory, wherein the computer-executable program logic is configured for the execution of:
receiving, from the compute node, metadata related to data stored within the distributed data storage system;
indexing the metadata from the compute node at a first one of the multiple burst buffers;
splitting the metadata from the compute node into two or more key spaces;
distributing the split metadata of the two or more key spaces to respective ones of two or more servers associated with respective other ones of the multiple burst buffers;
wherein the two or more servers comprise two or more Multidimensional Data Hashing Indexing Middleware (MDHIM) servers associated with the respective other ones of the multiple burst buffers;
receiving an aggregated request for a range of the split metadata;
sending the aggregated request to a particular server of the two or more servers having the range of the split metadata;
wherein the metadata from the compute node includes one or more transaction identifiers (TIDs);
wherein a user request for the split metadata includes the one or more TIDs combined with one or more keys; and
wherein the one or more keys are indexed according to one or more key-value parings of the one or more keys and the one or more TIDs; and
converting the user request including the one or more TIDs and the one or more keys to an MDHIM command, wherein the aggregated request is based at least in part on the MDHIM command;
wherein a plurality of input/output dispatchers are associated with the respective other ones of the multiple burst buffers; and
wherein a given one of the plurality of input/output dispatchers is associated with a first burst buffer node and is configured:
to convert the user request to the MDHIM command;
to communicate with at least one input/output dispatcher of the plurality of input/output dispatchers associated with a second burst buffer node different from the first burst buffer node; and
to dynamically reallocate storage of the split metadata between MDHIM servers associated with the first and second burst buffer nodes based on the communication.

9. The system of claim 8, wherein the computer-executable program logic is further configured for the execution of:
receiving a metadata request from the compute node to purge metadata; and
processing the metadata request.

10. The system of claim 9, wherein the processing of the metadata request comprises:
analyzing a metadata index to determine which portions of the metadata to purge; and
purging the determined portions of the metadata.

11. The system of claim 8, wherein the sending of the aggregated request is performed by one or more MDHIM clients with knowledge of which of the two or more servers has the range of the split metadata.

12. The system of claim 8, wherein the aggregated request comprises a batch request including a range of keys.

13. The system of claim 12, wherein the keys in the range are indexed with corresponding split metadata in a partitioned key-value store.

14. The system of claim 8, wherein a first one of the MDHIM servers associated with the respective other ones of the multiple burst buffers stores metadata related to objects, a second one of the MDHIM servers associated with the respective other ones of the multiple burst buffers stores metadata related to containers and a third one of the MDHIM servers associated with the respective other ones of the multiple burst buffers stores metadata related to checkpoints and transactions.

15. A computer program product for managing metadata, using one or more processors and memory, in a distributed data storage system, wherein the distributed data storage system includes multiple burst buffers collectively providing a key-value store enabled to store metadata, the computer program product comprising:
a non-transitory computer readable medium encoded with computer-executable program code configured to enable the execution of:
receiving, from a compute node, metadata related to data stored within the distributed data storage system;
indexing the metadata from the compute node at a first one of the multiple burst buffers;
splitting the metadata from the compute node into two or more key spaces;
distributing the split metadata of the two or more key spaces to respective ones of two or more servers associated with respective other ones of the multiple burst buffers;
wherein the two or more servers comprise two or more Multidimensional Data Hashing Indexing Middleware (MDHIM) servers associated with the respective other ones of the multiple burst buffers;
receiving an aggregated request for a range of the split metadata;
sending the aggregated request to a particular server of the two or more servers having the range of the split metadata;
wherein the metadata from the compute node includes one or more transaction identifiers (TIDs);
wherein a user request for the split metadata includes the one or more TIDs combined with one or more keys; and wherein the one or more keys are indexed according to one or more key-value parings of the one or more keys and the one or more TIDs; and converting the user request including the one or more TIDs and the one or more keys to an MDHIM command, wherein the aggregated request is based at least in part on the MDHIM command;

wherein a plurality of input/output dispatchers are associated with the respective other ones of the multiple burst buffers; and wherein a given one of the plurality of input/output dispatchers is associated with a first burst buffer node and is configured:

to convert the user request to the MDHIM command;

to communicate with at least one input/output dispatcher of the plurality of input/output dispatchers associated with a second burst buffer node different from the first burst buffer node; and to dynamically reallocate storage of the split metadata between MDHIM servers associated with the first and second burst buffer nodes based on the communication.

16. The computer program product of claim 15, wherein the code is further configured to enable the execution of:

receiving a metadata request from the compute node to purge metadata; and processing the metadata request.

17. The computer program product of claim 16, wherein the processing of the metadata request comprises:

analyzing a metadata index to determine which portions of the metadata to purge; and purging the determined portions of the metadata.

18. The computer program product of claim 15, wherein the aggregated request comprises a batch request including a range of keys.

19. The computer program product of claim 18, wherein the range of keys are indexed with corresponding split metadata in a partitioned key-value store.

20. The computer program product of claim 15, wherein a first one of the MDHIM servers associated with the respective other ones of the multiple burst buffers stores metadata related to objects, a second one of the MDHIM servers associated with the respective other ones of the multiple burst buffers stores metadata related to containers and a third one of the MDHIM servers associated with the respective other ones of the multiple burst buffers stores metadata related to checkpoints and transactions.

* * * * *